Oct. 15, 1968          D. L. BITZER          3,405,457

VERSATILE DISPLAY TEACHING SYSTEM

Filed Oct. 23, 1965          11 Sheets-Sheet 1

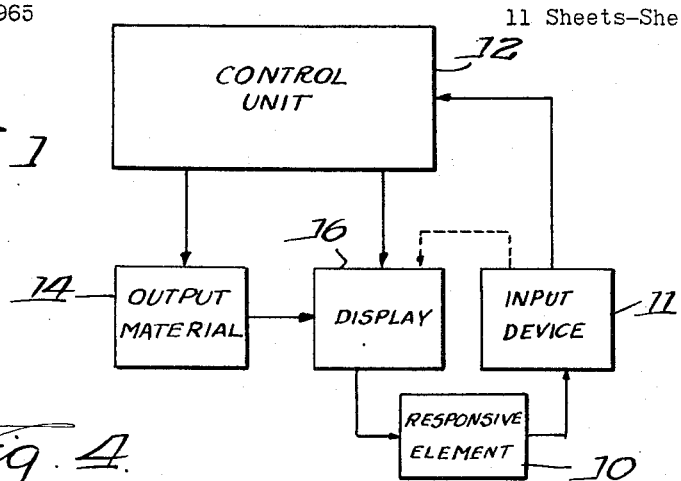

EACH POSITIVE INTEGER IS REP-
RESENTED IN DECIMAL NOTATION BY
COMBINING THE TEN DIGITS:
0, 1, 2, 3, 4, 5, 6, 7, 8, 9.
THUS THE SYMBOL '3,549' IS
INTERPRETED TO MEAN:
$3 \times 10^3 + 5 \times 10^2 + 4 \times 10 + 9$
i.e., $3 \times 1000 + 5 \times 100 + 4 \times 10 + 9$.

Fig. 5

QUESTION: GIVE THE POSITIVE
NON-TRIVIAL DIVISORS OF 51

$d_1 =$ [3.]    OK
$d_2 =$ [18.]    NO

Inventor
Donald L. Bitzer
By Merriam, Marshall, Shapiro & Klose
Attys.

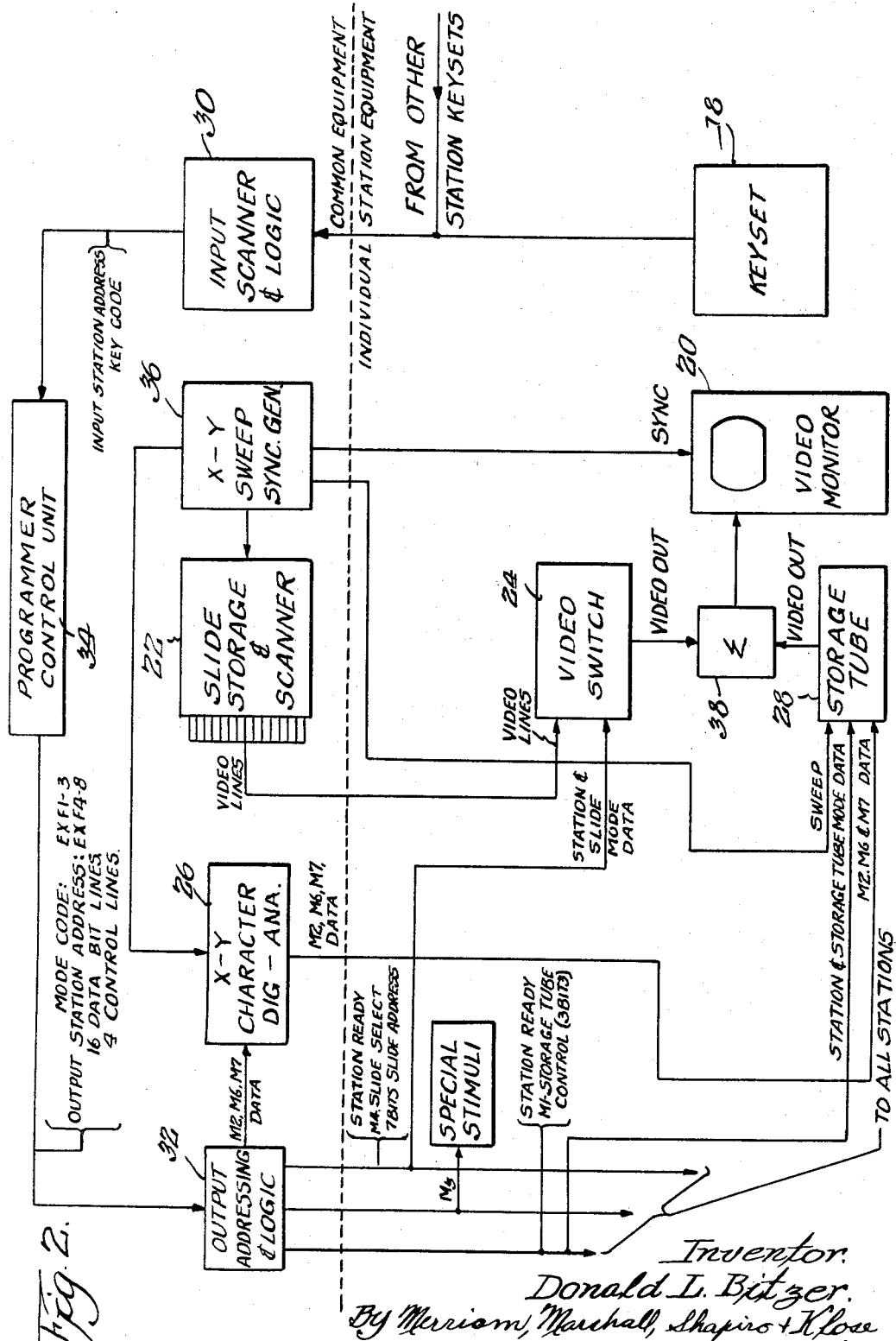

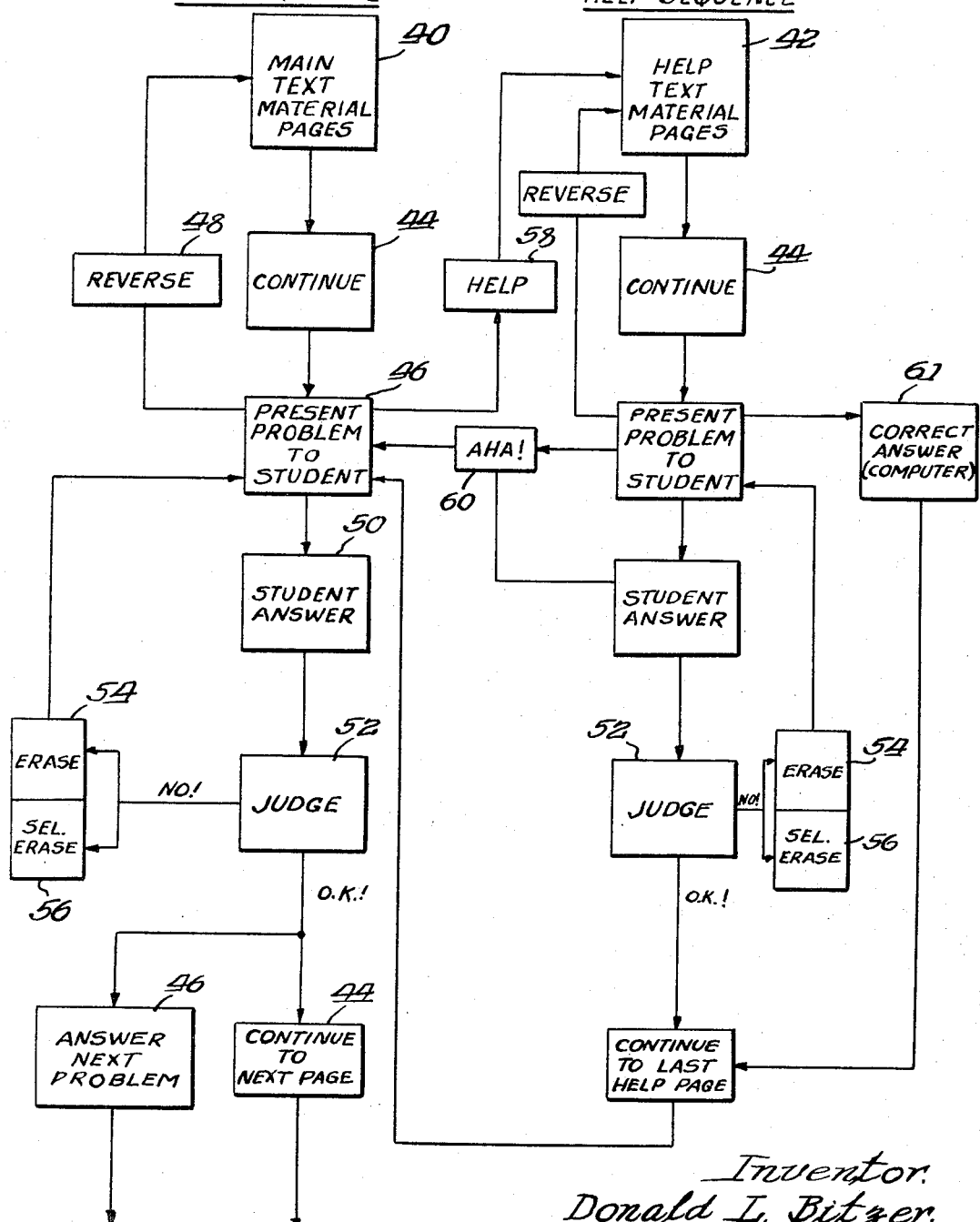

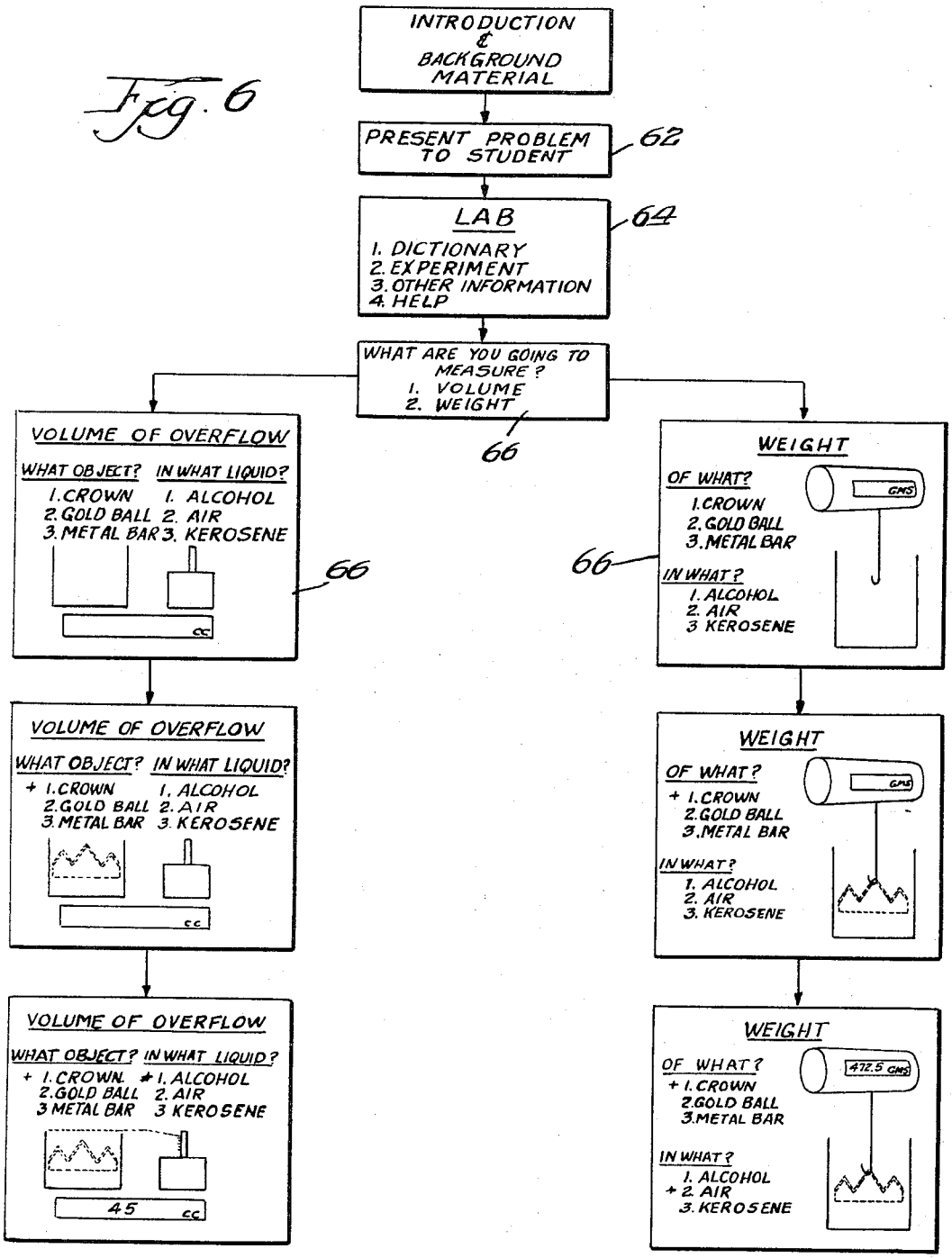

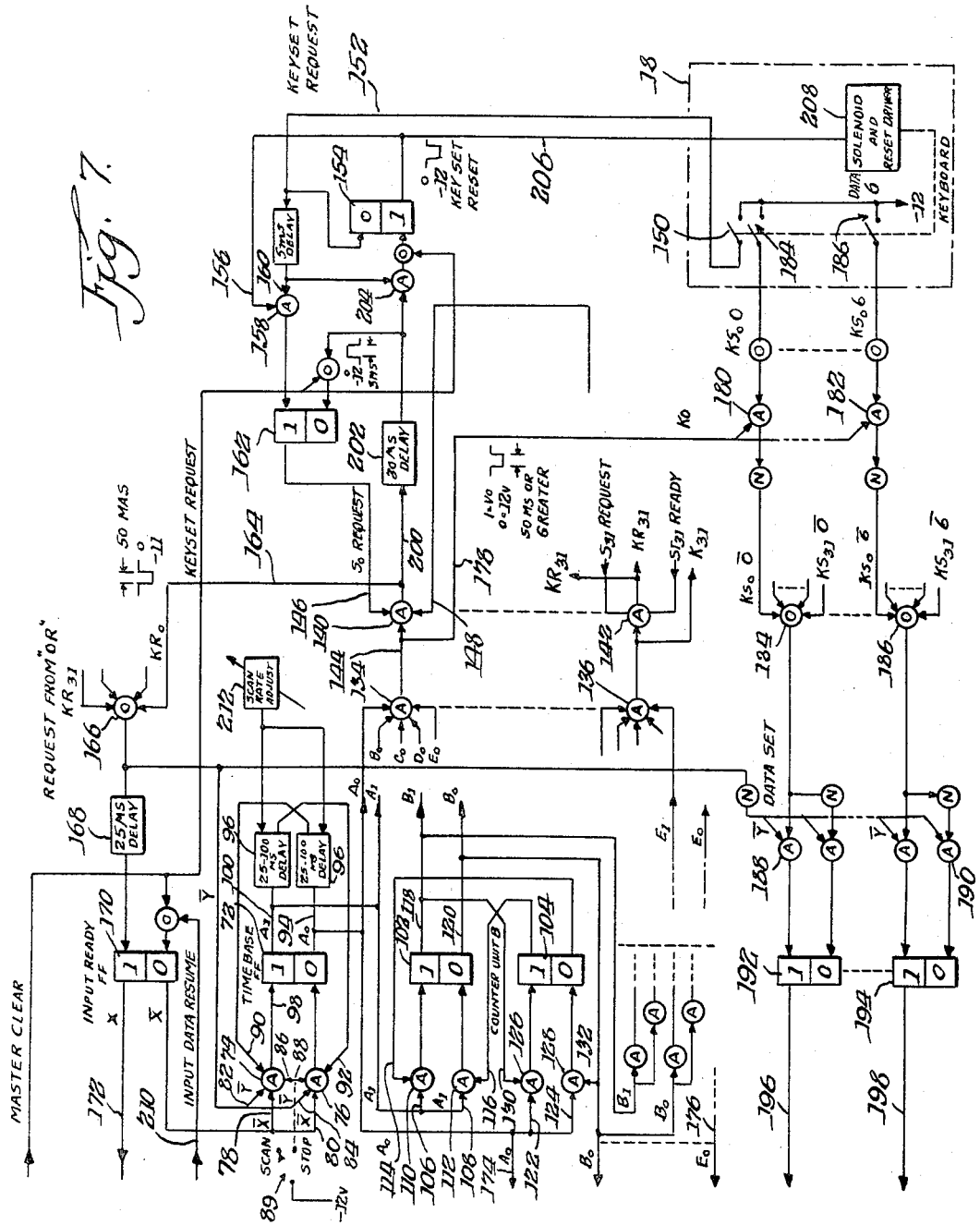

Inventor.
Donald L. Bitzer

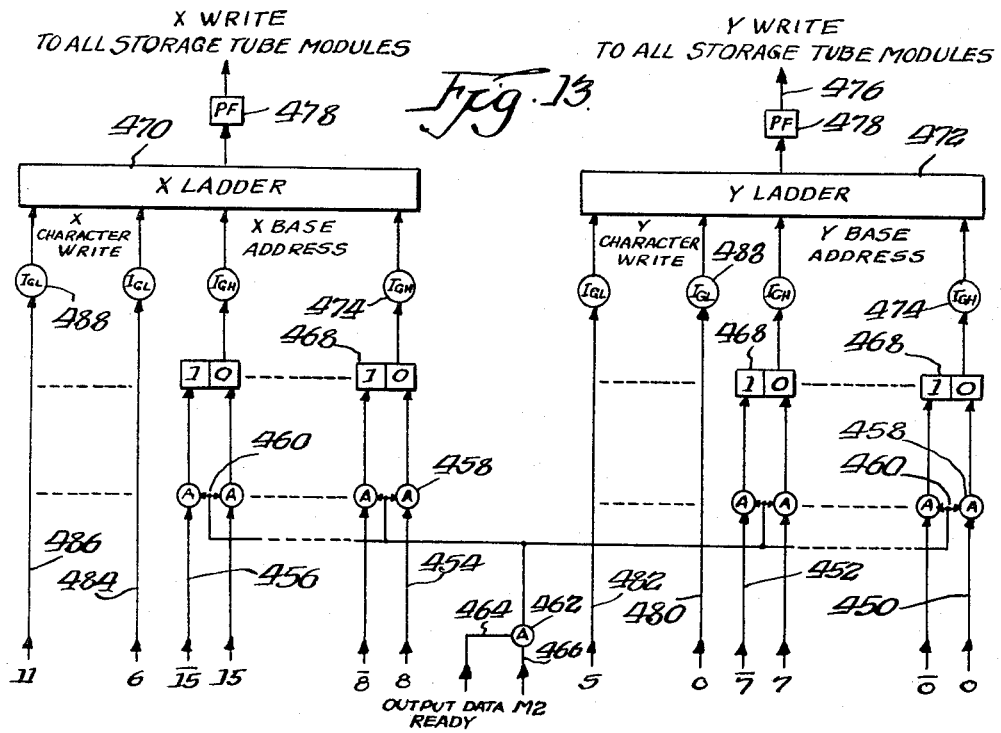
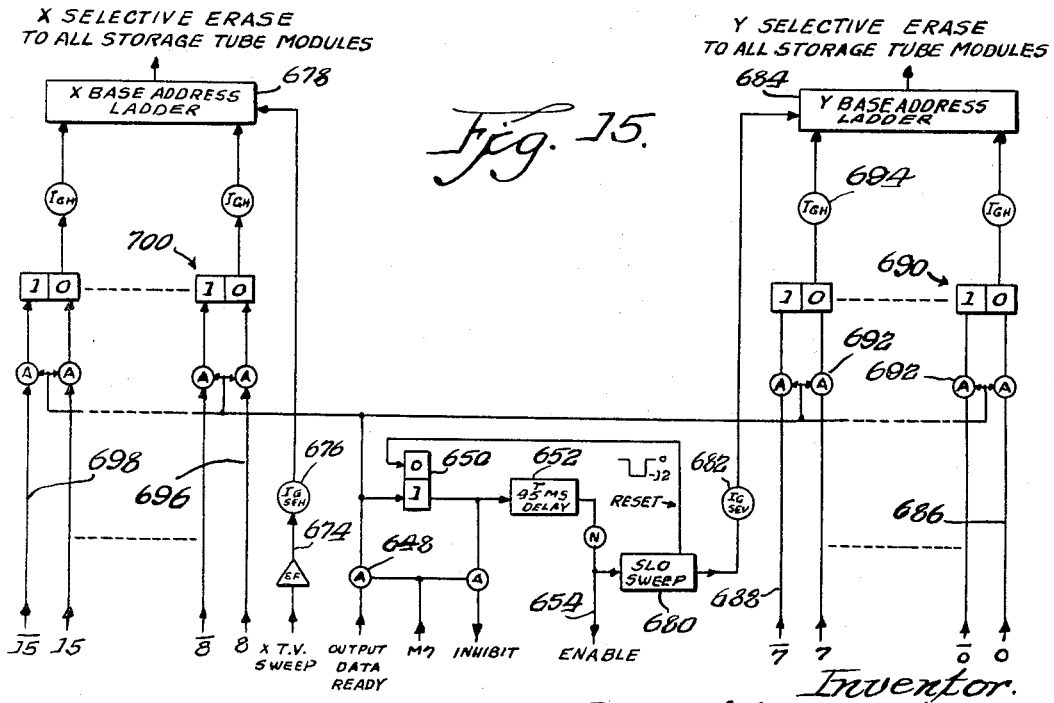

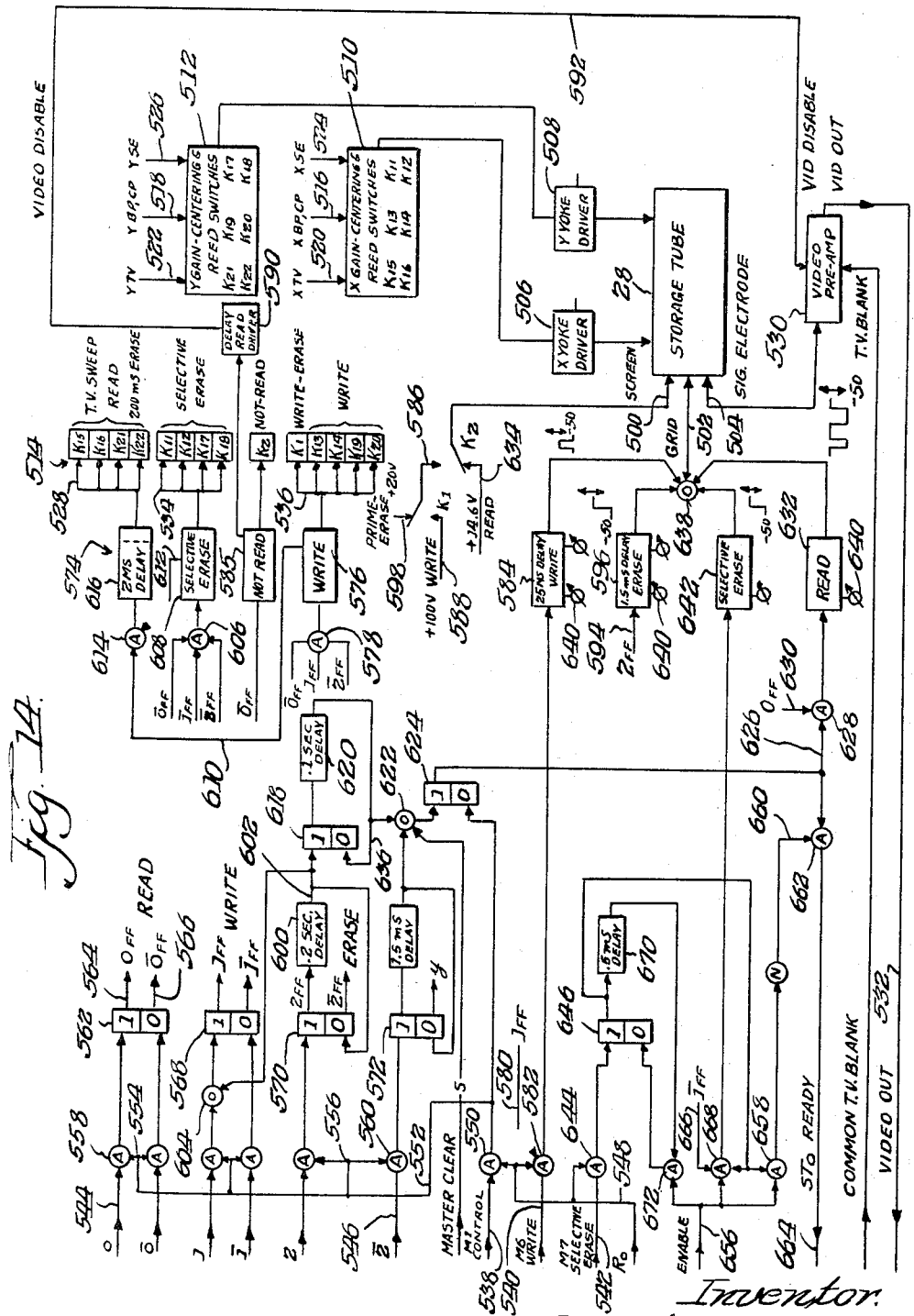

3,405,457
VERSATILE DISPLAY TEACHING SYSTEM
Donald L. Bitzer, Urbana, Ill., assignor to University of Illinois Foundation, Urbana, Ill., a corporation of Illinois
Filed Oct. 23, 1965, Ser. No. 502,887
16 Claims. (Cl. 35—9)

ABSTRACT OF THE DISCLOSURE

A flexible computer controlled display system for displaying various material, such as teaching information, to a display station or a group of such stations. When used for teaching a plurality of students, in accordance with a predetermined teaching logic, each student is individually processed through the teaching material at his own pace with a high degree of cooperation between the students and the computer control. Provision is also made in the system for varying the teaching logic.

---

In the teaching system, statements of questions, the student answers, and the results of the computer judging of the answers are presented simultaneously in a superimposed manner on the same display to the student. The student may also selectively erase a portion of his answer.

This invention relates to a display teaching machine system and in particular to a machine system for selectively displaying teaching material(s) to a student or a group of students acting and/or interacting collectively and/or independently and concurrently in time wherein a high degree of cooperation is provided between the machine and the students.

With an ever increasing number of students and the rapidly expanding amount of subject matter required to be taught not only to those students, but also to groups of individuals who must be trained or retrained in new areas, there is a definite need for a greater number of teachers and for more knowledgeable and capable teachers. The current trend has been to make use of our present technological advances, for instance to provide teaching via television and to increase the number of properly planned and applicable visual aids so as to more efficiently utilize teaching time. Along this line there is a distinct possibility that a versatile machine controlled teaching system that is supplied with a variety of suitable teaching material could be utilized to display this material to students in such a manner that a very high degree of logical cooperation between the students and the machine will result in significant reductions of teaching time and more efficient use of this time. It is to such a system that the principles of the present invention are directed.

Numerous prior attempts at developing a suitable machine controlled teaching system which is capable of displaying subject material to a student have utilized very basic display devices and methods. A common type of prior art system directly displays slides or sequentially stepped film frames, where the student views the material which may for instance be in the text form. Such systems utilize slide or movie type projections and a viewing screen. The viewing time can be controlled by the student who thus progresses through the displayed material according to his individual capabilities. Subsequent to viewing the material or during the viewing time questions are posed to the student who then writes or otherwise records his answers thereto. After the lesson, the question and answers are evaluated by an instructor and the student is advised as to his progress.

This manner of displaying teaching material is a very limited approach to the learing process since the student is not made immediately aware of his failure nor the nature of his failure to understand at least some of the subject material; and an attempt to supply the student with supplemental material at a later time results in an inefficient learing procedure because of the usually low retention of subject matter that was not originally fully understood. Also, the addition of supplemental material at a later time requires at least a partial review and display of the original material, thus drastically reducing the advantages of machine teaching in terms of more economical use of teaching time as compared to conventional classroom teaching.

In accordance with one aspect of the present invention material used in a teaching sequence is displayed under control of the student and the machine, and the student responses are simultaneously displayed in a superimposed manner with the display material.

The prior teaching systems hereinbefore described are also limited in that either only one student can utilize the apparatus, or in a very inflexible manner a number of students can be taught, but they would all be restricted to viewing the same material. Of course, a separate supply of slides and display apparatus could be provided for each individual.

It is thus very desirous that a teaching machine be able to logically display large amounts of teaching material individually to a very high number of students located at separate stations so that each student may progress through the material with respect to his own capabilities. This requires a highly flexible system and is accordingly a further aspect of this invention wherein each student progresses in cooperation with the machine and individually controls his display of teaching material independent of the other students. Thus, an important feature of the present invention is in providing a display teaching system with a multiplicity of student stations where teaching material can be displayed, and wherein a single control unit, such as a high speed computer, controls the proper sequencing of the material for each student and various operations to be performed at each station in accordance with prescribed instructions.

The use of a computer in the control unit is consistent with versatility in utilizing the various teaching material and the flexible peripheral display apparatus to operate in accordance with a variety of teaching logics, that is, a complete set of rules by which the teaching material is presented to the students. Two types of teaching logics which will be given as examples in the following description of the operation and apparatus are the tutorial and inquiry teaching logics. In tutorial teaching the student is given information and is asked questions which he must answer before continuing. In the inquiry logic, questions are posed to the student and he must derive the answers by "inquiring" of material to which he has access. For example, a student nurse might give medication to a simulated patient and request data on the physiological changes. The operations and the apparatus involved will be more readily understood from the following general and specific descriptions.

The present invention contemplates an extremely flexible display system having a programmed control unit operating under instructions in accordance with the type of teaching logic desired, and controlling the presentation of various material to a student with a high degree of cooperation between the student and the control unit. In the preferred embodiment of the invention the peripheral controlled equipment includes a keyset which is provided to enable each student to submit data to the control unit and to control the sequential presentation of material to the student. The keyset keys can represent a variety of functions, requests or commands, depending on the teaching program. For example, a first set of keys on the keyset can enable the student to request that the control unit provide digital information defining alphabet and numeric characters and algebraic expressions. A second set of keys on the keyset can enable the student to control the presentation of material; each of these second keys designating a function or operation that the student is requesting the control unit to perform.

In an example of the type of operations which can be performed utilizing the apparatus of this invention, the display material is presented to the student in the form of a video or television picture. This display material may contain a textual statement such as used in tutorial type teaching logic. Each student may select from a video storage section one out of a number of slides with each student controlling his individual progress through the slides. Interspersed in the text material are a number of questions which the student is required to answer before he can continue on in the program. The text material and the questions present the stimulus for the student, with the student response in one form accomplished by operating alphabet and numeric character keys on the keyset.

These student responses on the keyset send coded information into the control unit which then accordingly generates the desired characters for display on the video display apparatus. The characters forming an answer are superimposed on the student display apparatus with the video output of the particular slide displayed. Thus, the student is able to view his answer in the context of the questions.

The student may then request that the control unit judge the answer and display an indication as to whether the answer submitted was correct, incorrect, or even misspelled. Submission of a correct answer allows the student to continue on in the program along what may be termed the main slide sequence. However, if a wrong answer has been submitted the student may submit revised answers for further judging.

Where the student is encountering difficulty in providing the correct answer, he can request "help" in which case the machine will take the student out of the main slide sequence and provide him with supplementary material along a supplementary slide sequence. When the student completes the last slide of a "help" sequence, he is returned to the main slide sequence and he is again presented with the original problem. In the event the student has not obtained the necessary help from the first "help" sequence he can be again put into further supplementary "help" sequences. Upon completion of all the "help" sequences and, if the student still has not respond with the correct answer to the individual problem, the control unit can provide him with the correct answer by typing this information in on his video display apparatus.

The student may also recall for display previously presented slides, in which case these slides will be displayed with the correct answers superimposed on any questions presented therein. When the student is in a "help" sequence, and he now believes he can furnish the correct answer to the original question, he may remove himself from the "help" sequence and ask the machine to once again display the slide having the original question. The student may also erase all or selectively erase a part of his previous answer so that he may then make another attempt at furnishing the correct answer.

As mentioned previously one type of display teaching material consists of a number of slides containing text material, and the student controls the sequential display of this material to him. A further and important aspect of the present invention concerns the performance of all of the above operations for a plurality of individual and separate student stations under control of a central programmed computer. Each of the separate stations accommodates the student who individually controls his progress through the teaching material stored in the system. The student requests and the number of correct and incorrect answers are stored in a memory unit for possible subsequent use. The central control unit receives requests and commands from a keyset at each of the stations, operates on this input data in accordance with programmed instructions, and transmits output information to the correct station. The proper identification of input information from a plurality of stations to the computer; and conversely, after computer processing, the identification of output data from the computer to a plurality of stations is accomplished by respective input and output logic equipment in cooperation with the computer.

The input logic equipment identifies and transmits the station number initiating a request, and also transmits to the central control unit the code of the particular request. The control unit processes the request in accordance with the teaching rules and submits this output information to the output logic equipment. The output logic equipment in turn selects the station, normally the requesting station, but it may also be any other station selected by the teaching rules, which is to receive the processed data and also transforms the processed output data from the computer into a form compatible wtih the designated operation to operate selected equipment at the selected station.

Several modes of operation are possible, for instance, selecting a slide from the slide storage section for display, writing of characters and superimposing this information on the slide information for display, erasing all of the displayed characters or selectively erasing portions thereof, requesting the display of special sitmuli such as external video or a film strip, recording changes of environment, dispensing candy, activating voice playback, etc. The output logic equipment thus presents the computer processed data to the proper equipment in the system and in accordance with the initial mode request. The input and output logic equipment in effect provides a working link between the central programmed control unit and the equipment at a plurality of student stations to enable each student to progress through the teaching material in accordance with his own capabilities and in an extremely flexible manner with the central control unit servicing all of the student stations in a manner which insofar as the students are concerned is simultaneous. In this multiple student station system each of the stations includes display apparatus and apparatus for initiating requests. All of the stations share the central control unit and the display teaching material. Thus, particulr attention is directed to the extreme flexibility of the peripheral equipment, and especially when this equipment is controlled by a control unit which includes a high speed computer.

This invention will be better understood from the following detailed description thereof taken in conjunction with the accompanying drawings, in which:

FIGURE 1 is a block diagram of a display teaching system according to the invention.

FIGURE 2 is a block diagram of a display teaching system for a number of students which utilizes the principles of this invention.

FIGURE 3 is a pictorial illustration of a teaching program incorporating tutorial type teaching logic.

FIGURE 4 is a pictorial diagram of a slide presenting information to the student in accordance with tutorial type teaching logic.

FIGURE 5 is a pictorial diagram of the slide utilized in tutorial teaching logic and upon which in a superimposed manner the student has presented his answer, and a control unit has compared the answer with the question and indicated the result.

FIGURE 6 is a pictorial diagram illustrating a teaching program incorporating inquiry type teaching logic.

FIGURE 7 is a schematic illustration of logic apparatus controlling the input of information from the student stations to the control unit.

FIGURE 13 is a schematic diagram illustrating apparatus for converting digital information from the control unit into analog information for the cathode ray tube display during a writing operation.

FIGURE 14 is a schematic diagram of logic apparatus for controlling writing, erasing, selective erasing or reading operations to be performed by a storage tube.

FIGURE 15 is a schematic diagram illustrating apparatus for converting digital information to analog information during a selective erase operation of the storage tube.

Figure 8:
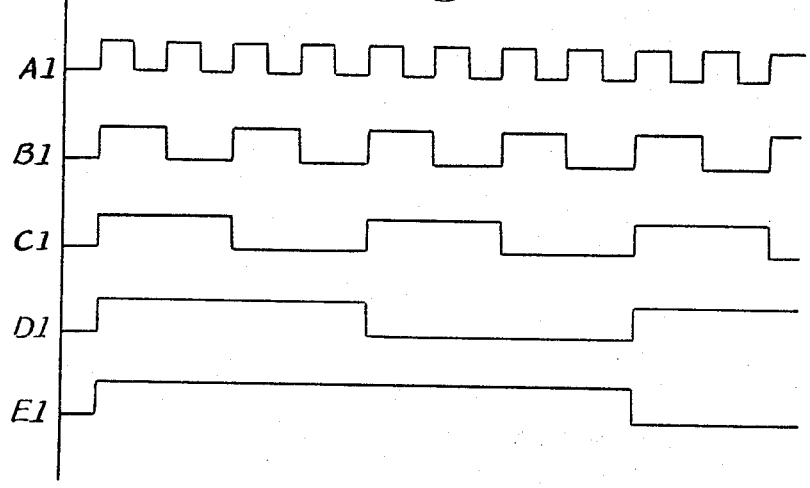
FIGURE 8 is a pictorial diagram illustrating the scanning operations of the logic apparatus shown in FIGURE 7.

The present invention contemplates a flexible teaching machine system as shown in FIGURE 1 in block diagram form where a responsive element 10, such as a student, receives a stimulus and operates an input device 11 to request a control unit 12 to provide an item of teaching material from the display material storage section 14 for display on the display device 16. The display device 16 can be a video monitor for visual displays or an actuated audio device, such as bells, etc. The input device 11 in one example could be an ordinary type of keyset having a number of alphabet, numeral and logic designated keys. The logic keys are utilized to request the performance of certain desired operations in the system. Sensing devices may also be utilized in the input device 11, for example, to record the student's physiological reactions, obtain data for experiments, etc.

In the output material section 14 there is located the teaching material which is to be called upon for display. This material consists of slides, movie films, television pictures, a blackboard, etc.—a variety of teaching material which may be required for display on the display device 16. This teaching material for tutorial type teaching logic is in textual form with questions interspersed throughout the text. For inquiry type teaching logic where the student is permitted to ask questions, there is provided information which the student may call upon to, for instance, construct an experiment. In one embodiment of the invention herein to be specifically described, the text information is presented in a plurality of slides in the storage section 14. A student progresses through the teaching material by operating the input device 11 to request the control unit 12—which includes a general purpose computer—to designate for instance the requested slide in the storage section 14 to be displayed on the display device 16. After the individual has read the text material, he may be required to answer a question before proceeding to the next slide. As he indicates his answer, for example by operating a keyset, a character generator writes out the answer on the display device 16 in a superimposed manner on the textual slide information from the storage section 14. The student thus views his answer in the context of the posed question. To proceed further the student requests that the control unit judge his answer and the student is then informed as to whether the answer is correct. If the answer is correct, the student proceeds to the next subject material. If the answer is incorrect, the control unit 12 provides the student with supplementary or "help" material.

Referring now to FIGURE 2, there is illustrated a preferred embodiment of the present invention which incorporates the basic concepts of a system as illustrated in FIGURE 1. It is recognized, of course, that other systems can be designed which incorporate the basic teachings of the present invention, and that therefore the system as illustrated in FIGURE 2 and which will be hereinafter more specifically described is only a representative of a particular system which has been constructed and found to operate successfully in accordance with these basic teachings. The system as illustrated in FIGURE 2 provides a common central control unit which is shared by a plurality of individual stations each having a separate keyset 18 and a cathode ray tube video monitor 20. A common slide storage and scanner 22 containing up to 122 different 35 mm. slides and 6 television channels are shared by all the student stations, although the student stations can all be viewing the same or different video information simultaneously.

The storage slide information is transformed into video information by a flying spot scanner and photo tube arrangement. The output of the slide storage and scanner 22 is composed of 128 video transmission lines on which video information is available from all of the slides and 6 television channels concurrently. All of the students may view a different slide or the same slide by coupling the particular video monitor 20 through a respective video switch 24 at each of the stations to the desired slide. The particular slide which is to be connected to a video monitor at the stations is determined by slide select mode data which selects at each of the stations the proper video output line and thus the correct slide for the particular stations. For convenience, it may be understood that the operations described for selecting slides, and transferring video slide signals, etc. are the same as similar operations involving any video signal sources which are available through the video switch.

The information stored on each of the slides is of the types such as is normally found in a text book, with each of the slides being thought of as pages in the book. Each of the slides may contain one or more questions and the student is allowed to type in his answer in a superimposed manner on the slide information displayed on the video monitor 20. For this purpose the system includes a character digital to analog converter 26 which transforms digital information from the control unit into analog information so that diagrams, symbols, and words can be written in a point-by-point fashion on a storage tube 28 for display on the video monitor 20 at the corresponding student station.

For purposes of orientation and familiarizing one with the equipment presented in FIGURE 2 and its relation to the diagram as illustrated in FIGURE 1, the control unit 12 indicated in FIGURE 1 can be thought of as comprising in FIGURE 2 input scanning and logic apparatus 30, output selecting and logic apparatus 32, a programmer control unit 34 and a timing unit identified as a "sweep sync" generator 36. Thus, as is illustrated in FIGURE 2 the common equipment which is shared by all of the student stations in this particular embodiment of the invention is illustrated above the dashed line, whereas the individual equipment located at each of the student stations is illustrated below the dashed line.

The programmer control unit 34 includes a general purpose computer which has been programmed so as to process input information from a plurality of student stations sequentially and provide output data in digital form for presentation to a selected student station. The use of the programmer 34 with the input and output logic apparatus 30 and 32 provides a very flexible system which can perform a variety of teaching operations in accordance with desired interchangeable program instructions.

The programmer control unit 34 sequentially receives input data from the keysets 18 at each of the student stations. For purposes of illustration, the description of the system will assume that 32 student stations have been provided, although this number depends mainly on the capabilities of the central computer and is by no means the upper limit of student stations which can be handled. The input scanner and logic apparatus 30 includes a scanning station address generator which provides addressing information in the form of 5 data bits such that a single station out of the 32 stations can be identified. The address generator continuously provides in a sequential scanning manner the identifying Station Address to the respective student station, and at the same time this addressing information is available to the programmer control unit 34.

At the particular moment when the station address generator is providing the address identifying a particular station which has initiated a request, a signal is sent that transmits the station keyset data to the computer. The series of 5 data bits identifying the particular station is transmitted to the computer along with the keyset data. The key code consists of 7 data bits identifying the particular key which has been operated. The operations which are performed in accordance with each key are controlled by the programmer 34 and can be varied by changing the computer program of instructions.

Thus, the input logic block 30 continuously and sequentially generates a Station Address for each of the 32 stations, and when a key is operated in a particular station, the following information is sent to the programmer 34: (1) Station Address consisting of 5 data bits which identifies the particular station initiating a request; and (2) a key code consisting of 7 data bits identifying the particular key which has been operated in the initiating weyset.

Both the Station Address and the key code are fed into appropriate registers in the programmer control unit 34, with the programmer processing the input data in a sequential manner and in accordance with instructions designated by the computer teaching logic.

As the programmer 34 sequentially receives input information from the particular requesting stations, it processes this data and transmits appropriate data thereafter to the proper station. Each station receives the output information in a selected manner.

After the programmer control unit 34 has processed the incoming data from a particular station, the output select and logic apparatus 32 operating under instructions received from the programmer 34 generates an Output Station Address which identifies the particular station for which the output data has been processed by the programmer. Five data bits identified in FIGURE 2 as EXF 4–8 are received from the programmer 34 which are then utilized in the output logic block 32 to generate an Output Station Address identifying one of the stations out of 32 such stations. Upon receiving an indication from the programmer 34 that the output data is ready for transmission to the particular station, the output logic block 32 provides a Station Ready Control signal, corresponding to the generated Output Station Address, which control signal is sent to various equipment at the particular station, such as the video switch 24, the storage tube 28, and to the control units of film projectors and other desired external stimuli.

In addition to the Station Ready Control signal, the programmer 34 and the output logic apparatus 32 also generate the Mode bits of a Mode Code which identify the operation to be performed in response to a keyset signal for the particular student. The Mode Code distinquishes which of the equipment at the selected station receiving the Station Ready Control signal is to be operated, and also determines the manner of operation.

Thus, when the programmer 34 has processed input data from one of the requesting stations in accordance with programmed instructions, the programmer and the output logic block 32 provide an Output Station Address and Station Ready indication to select the desired station, and the Mode Code to direct certain operations to be performed for the selected station.

The following table lists the several modes and the corresponding operations performed by the system in accordance with these Modes.

Mode 1 (M1)—Storage Tube Control
Mode 2 (M2)—Character Base Position
Mode 3 (M3)—Special Stimuli (projector, etc.)
Mode 4 (M4)—Video-Slide Select Mode
Mode 5 (M5)—Sound Select Mode
Mode 6 (M6)—Write Character Point
Mode 7 (M7)—Base Position, Selective Erase As has been mentioned previously, the Mode determines the proper equipment operated at the selected station and in some cases determines the manner of operation of such equipment. For instance, if a student at a particular station has completed a slide and requests that the next slide in the sequence be displayed, he operates in the keyset 18 a key which presents to the programmer control unit 34 a Key Code which in the context of the teaching logic indicates that Mode 4 is to be performed for the requesting student. The programmer control unit 34 having stored in its memory section an indication of the last slide displayed to the particular student, sends out three data bits identified in FIGURE 2 as EXF 1–3 which is transformed by the output logic block 32 into a code indicating M4—the Video-Slide Select Mode. With this code the video switch can select any of the video transmission lines containing television channels or video signals representing slide information.

The M4 signal is presented to all of the video switches 24, however, only the particular video switch in the station selected by the Station Ready signal will be operated. Therefore, the Station Ready Control signal selects a particular station for sending data thereto, while the Slide Select Mode or M4 signal idicates to the video switch at the selected station that a single slide is to be selected from the slide storage and scanner unit 22 by the video switch for display on the video monitor 20. The video switch also receives data from the programmer control unit and the output logic apparatus which indicates the Slide Address of the desired slide. At the selected video switch 24 the Station Ready Control and the M4 signals place the Slide Address into a register which thereafter supplies the Slide Address to the video switch to gate out one of the video lines corresponding to the slide distinquished by the Slide Address.

The video information input to the video switch 24 consists of 128 video lines each containing video information corresponding to one of the slides in the slide storage and scanner 22. The Slide Address is a seven bit data word thus enabling the identification of an individual one of the 128 video lines. The desired video line is gated from the video switch 24 to a summing circuit 38 which enables the slide video and video information received from the storage tube 28 to be placed in a superimposed manner on the cathode ray tube monitor 20.

Another operation which is to be performed by the system is the writing of characters on the video monitor, which operation is performed when the student is responding to a question or problem presented to him. The student responds by typing his answer on the keyset 18, which information is processed to generate data corresponding to Modes 1, 2 and 6.

The Storage Tube Control Mode 1 data contains the necessary control information to inform the storage tube circuitry which of 4 different types of operation will be performed on the storage tube. That is, the storage tube 28 can be controlled by Mode 1 to perform the following operations:

(1) Writing of characters on the storage tube;
(2) Reading out information on the storage tube into the video monitor 20;
(3) Erasing all of the previously written characters on the storage tube; and
(4) Selectively erasing previously written characters on the storage tube.

The Mode 1 instructions consist of a three bit data word which selects one of the above 4 operations. This Mode 1 data is gated to the particular storage tube in the station which has been selected by the Station Ready Control signal to receive the Mode 1 instructions.

Along with this Station Ready Control and Mode 1 information the selected storage tube also receives data corresponding to whether the storage tube has been instructed to write characters or to selectively erase previously written characters.

If the Mode 1 data word directs that a character writing operation is to be performed on the storage tube, the X-Y base address and character D-A converter 26 receives Mode 2 data consisting of a signal indicating that a Mode 2 operation is to be performed and a 16 bit data word. The Mode 2 data word is divided into 8 bits which signify the X Base Address, and 8 bits denoting the Y Base Address.

Character writing on the storage tube is accomplished by a point-by-point plot on the storage tube which in effect has been divided into a character grid of 256 x 256 orthogonal grid lines. The Mode 2 data information contains 8 bits signifying the X base position and 8 bits defining the Y base position based upon a grid twice as coarse as the character grid. The X-Y Base Address thus defines a base point in the grid pattern for a particular character which is then used as a reference in writing of the character. The information required for writing of the particular character is provided by Mode 6 data consisting of a 12 bit data word. With respect to the reference position established by the Mode 2 data, 2 groups of 6 bits each are utilized to specify respectively each X-Y character point. Both the Mode 2 and the Mode 6 digital data are properly transformed into analog information by the X-Y D-A converter 26 for operating the X and Y deflection circuits in the storage tube 28. Therefore, when it is desired to write a character on the storage tube 28 a Mode 1 data word indicating "write" is generated and sent to control the required logic circuits in the storage tube. Mode 2 information indicating the required base position for the character to be generated is transformed by the converter 26 into the required X-Y deflection voltage for the storage tube to sweep the storage tube electron beam (no "writing" occurs during this operation) to the desired grid point. The storage tube also receives a Mode 6 instruction signal which gates on the storage tube and allows the first point or spot of the character to be written in on the storage tube. Following this operation Mode 6 data continuously provides information defining further spots or points in the character until the complete character has been accordingly written. The storage tube 28, of course, retains the written character information and when desired this video information can be continuously read out of the storage tube and into the video monitor 20 when directed to do so by the proper Mode control data word.

The system is also capable of selectively erasing characters and for this operation Mode 7 information is utilized. Mode 7 consists of a 16 bit data word with the two groups of 8 bits each being utilized respectively as X and Y base positions of a small raster which is sufficient to blanket the character desired to be selectively erased. The Mode 7 data word specifies a corner point of a small raster which is only one small part of the total raster forming the effective storage tube grid. Using this point as a reference, sweep circuits in the storage tube are then operated to provide the small raster which effectively erases only the character desired.

*Computer programming logic*

Before discussing in detail the apparatus illustrated as an example in the block diagram form in FIGURE 2 for performing the operations heretofore indicated, it may be appropriate to now present examples of the teaching logic which are included in the program instructions to the programmer 34. The programmer 34 includes a general purpose computer to process the program instructions and transmit output control data to various equipment in the system in a manner as previously indicated. It is recognized, of course, that various types of teaching logics can be employed with the system of the present invention, since this merely requires the writing of corresponding programs for the computer in the programmer 34.

It may be particularly noted that the system as illustrated in FIGURE 2 has been utilized to perform according to several different teaching logics, two of which— a "tutorial logic" and an "inquiry logic"—are presently described. In tutorial teaching logic, facts and examples are presented to the student, and questions are then asked covering the presented material. In the inquiry teaching logic, general problems are presented to the student who is then required to search for, request, and organize appropriate information to derive answers to the problems.

A flow diagram illustrating a tutorial type teaching logic and the corresponding operation steps is shown in FIGURE 3, and by utilizing the information presented therein a program can be set up which will provide the computer with the necessary intructions so that the computer can control the various peripheral equipment in FIGURE 2 in accordance wiith the teaching logic diagram of FIGURE 3. It is understood, of course, that the programmed logic shown in FIGURE 3 can be performed for all of the student stations controlled by the programmer 34 with each of the students operating independently of each other and the programmer 34 processing input information from all the stations and transmitting such processed information to the proper station.

The keys at each of the individual keysets 18 are used for sending input information into the central control unit, and can be divided into three types: (1) those used for inserting constructive responses to questions; (2) those used by the student to control his individual progress through the lesson material (3) and those which may be used to alter the material and program, in what is called the Author Mode. The first type of keys are used to request the construction of characters, both alphabet and numerical, on the video monitor 20. The second type of keys on the keysets 18 may be termed "logic" buttons and are labeled "continued," "reverse," "judge," "erase," "selective erase," "help," and "aha." The third type of keys embody both logic control and alphanumeric information. The significance of these types of keys will become more evident in the following description which relates the programmed logic of FIGURE 3 with the operations of the apparatus in FIGURE 2.

In the tutorial programmed logic of FIGURE 3, the lesson material consists of text material in the slide storage and scanner 22, and of other special stimuli which may be requested for viewing. This lesson material is divided into the main sequence consisting of text material 40 through which all of the students progress, and the help sequence with corresponding help text material 42 that is provided for students who have difficulty with questions in the main text 40. Each student begins by viewing the text material 40 in the main sequence, and after reading each page of the text material, he can proceed to the next page by operating the "continue" button which places the student in a continue operation 44.

Operation of the continue button enables a Key Code to be sent to the programmer control unit 34 which indicates the key and the corresponding mode of operation requested by the student at the particular station. In addition, the programmer 34 receives a Station Address indicating the particular station which has requested service. The programmer 34 then checks to ascertain the previous slide submitted to the requesting station, and generates both a Station and a Slide Address which is further processed by the output logic block 32 in order to direct the video switch 24 at the requesting student station to select the desired slide from the slide storage and scanner 22 and present this slide to the student on his video monitor 20.

As the student proceeds through the main text material 40, he advances to the problem stage 46 in the programmed logic, wherein problems in the form of questions pertaining to previously viewed text are presented to the students. At this point the student may operate his reverse button to transfer the student into a reverse operation 48, which requests the programmer 34 to re-display a preceding page of the main text material 40. In this operation, the programmer 34 receives the particular Station and Key Code and transmits the corresponding Station and Slide Addresses.

When a student is viewing and working on a page that contains questions, the programmed teaching logic can be arranged such that all the questions must be answered correctly before the student may continue. A student answers a question by using the buttons labeled with numerals and letters or with any other symbols chosen by the lesson planner. In the programmed logic answer stage 50, the student types his answer on his keyset 18. The programmer 34 again receives the Station and Key Code and during this character writing mode the programmer 34, the output logic block 32, and the X–Y base address and character digital analog converter 26 presents M1, M2 and M6 mode data to the storage tube 28 so as to generate on the storage tube and to present on the video monitor 20 the characters requested by the particular student in his operation of the keyset 18.

By operating a judge button the student requests that the programmer 34 perform a judging operation 52 on the submitted answer in relation to the question. The judging operation 52 performed by the programmer 34 may consist of a simple comparison between the submitted answer and the correct answer stored in suitable memory sections of the programmer, or the programmer may perform a series of arithmetic operations to derive the correct answer for comparison. If desired an elaborate judging sub-routine program can be provided for the computer in the programmer 34 so that answers submitted in various forms all of which are technically correct will be so recognized by the programmer 34. For instance, in answer to the question 2 plus 2 the student may type an answer in the numerical form 4 or in the letter form four. A simple judging routine for the programmer 34 would only establish that the numerical answer was correct, whereas a more exotic judging routine would also recognize that the letter form of the answer was also correct. Which type of judging sub-routine is used, is of course, a matter for the lesson planner to decide for himself. However, it may be noted that in the system of this invention, with the programmer 34 containing a general purpose computer, a high degree of flexibility is provided which enables the lesson plannar to choose a variety of teaching logics and corresponding sub-routines by merely writing a corresponding set of program instructions for the computer.

After the judging routine has been accomplished by the programmer 34, character writing mode data is presented to the particular station to indicate whether the student's answer was correct or not. If the student's answer was correct, an "OK" indication is presented on the student's video monitor 20 immediately adjacent the answer. If the student's answer is not correct, a "No" is similarly presented unless it is misspelled, in which case SP is presented. Thus, it may be noted that the question presented to the student, the answer submitted by the student, and the judging results are all presented in a superimposed manner on the video monitor 20, so that the student may view the question, his answer, and the results simultaneously.

If the submitted answer was correct, the student goes on to the next question and corresponding operations as previously indicated are performed. When all of the questions on the page have been answered correctly, the student continues to the next page of the text material 40 until the main sequence has been completed.

In FIGURE 4 there is illustrated a slide which is typical of the type of information which can be stored in the slide storage and scanner 22. This slide is indicative of the type of material which is presented to the student on his video monitor 20 as he progresses through the main sequence.

FIGURE 5 is an illustration of a slide which presents a question or problem to the student with a selected area of the slide set apart for the student answer to be placed therein. The student has indicated and has correspondingly typed an answer of 3 to the first of the questions in FIGURE 5 and this character has been written on the storage tube in the appropriate location so that upon superimposing the slide video with the character video from the storage tube on the video monitor 20 the student answer appears in the proper position and simultaneously with the question. Upon judging of this answer by programmer 34, and having found the answer is correct, the characters "OK" are written on the storage tube at the correct location for superposition on the video monitor 20 immediately adjacent the relative question and answer. FIGURE 5 illustrates that the answer 18 has been indicated by the programmer 34 as not a correct answer to the question.

If the student's submitted answer is indicated as incorrect the student may request an erase operation 54 by operating an erase button which will remove only the incorrect answer from his video monitor 20. He may similarly operate a selective erase button which will provide selective erase operation 56 to only erase desired portions of his typed answer. This allows the student to make further attempts at obtaining the correct answer to the posed question without going through the annoying and time consuming process of erasing his entire display and re-typing only what he now desires. If difficulty is experienced with a question, the student may operate a help button which removes the student from the main sequence and through an initiating help operation 58 transfers him to a help sequence with associated help text material 42 containing text material pertaining to the question presenting difficulty.

In the help sequence the programmed teaching logic is similar to that in the main sequence. The student is presented with the help text material 42 which consists of explanatory material on slides in the slide storage and scanner 22. This comprises both text and "help" questions, and the student proceeds through the help text material 42 by correctly answering the question. Upon completion of the help sequence the student is automatically returned to the question in the main sequence. However, if the student believes he now has the answer and wishes to return to the main question without completing the help sequence, he may request this by operating an "aha" button initiating an "aha" or return operation 60.

If desired, additional help sequences may be provided to assist a student who is having difficulty answering questions in the previous help sequence. If all help is exhausted for a question and the student requests more help, he is informed that no more help is available and that he can either try answering the question again or have the computer supply the correct answer through an operation step 61.

An additional operating sequence may be termed an Author Mode, in which for instance, an instructor through one of the stations can change the organization of the teaching material, change data relating to the lesson material, change the correct or incorrect answers, etc., while the students are operating on their stations. Thus, this supplemental operation allows the instructor to effectively change the teaching rules under which the students are operating. No additional equipment is required, since this operation is accomplished by providing suitable instructions to the programmer control unit 34.

In order to adapt lesson material for the tutorial logic program illustrated in FIGURE 3, one must organize the teaching material in a set of slides, and if desired a help sequence for the questions in the main sequence may also be prepared. A program of instructions for the computer in the programmer control unit 34 must then be prepared in accordance with the logic sequences in FIGURE 3. In addition, a parameter tape containing the answers to the questions and their locations on the slide page as well as the order in which the slides are logically connected is read into the computer memory section so as to be available to the programmer 34. It may be particularly noted that the programmed logic shown in FIGURE 3 applies to the sequence of operations to be performed for a plurality of students located at individual student stations each requesting certain information and each receiving corresponding information individually by virtue of the common equipment illustrated in FIGURE 2. Each student progresses through the programmed logic of FIGURE 3 according to his own capabilities and with all the students in effect sharing the common equipment.

As mentioned previously, another type of teaching program which has been utilized by the system of FIGURE 2 is the "inquiry teaching logic" where the student is allowed more control over the teaching material presented to him, and in which the student is allowed to ask questions. In this type of teaching logic the student is presented with problems and he must then organize information available to him so as to derive the answers to the question. This use of the inquiry logic provides in effect a simulated laboratory situation for the students wherein the students can exert almost complete control over their movement through the lesson material.

FIGURE 6 illustrates a possible sequence of events that could occur while a student is progressing through material following the inquiry teaching logic type of presentation. It is understood, of course, that the teaching logic illustrated in FIGURE 6 forms the basic logic arrangement which is utilized to prepare a set of program instructions for the computer in the programmer 34. The student begins the teaching sequence by viewing a film or is presented text material in the form of slides as has been previously described. Problems are then presented in operational stage 62 to the student who is required to request from available material information to derive the appropriate answer. The student can make his choice of the information to be presented to him by operating a lab button which provides the student with a number of operations 64. The lab button transfers the student from any point in the program to the operational stage 64 which allows him to make a complete choice of information he can request. As indicated in FIGURE 6, for example, the student may request the definition of certain words by operating the keyset number 1 button which presents to the student on his video monitor a list of selected words and their corresponding definitions. This is accomplished in a manner similar to that explained during the tutorial programmed logic sequence when the student was requesting that the next slide be presented to him. Thus, by operating the keyset number 1 button both a Station and a Key Code are transferred to the programmer 34, which through the output logic apparatus 32 transfers an Output Station Address and the corresponding Mode 4 Slide Select data to the proper equipment in the requesting station.

Similarly, by operating the lab button the student can also choose to perform experiments by depressing the corresponding keyset button. FIGURE 6 illustrates some of the slides 66 which are utilized when the student is requesting that experiments be performed. As an example of this type of operation, FIGURE 6 shows a possible sequence of events which could occur while the student is utilizing the inquiry teaching logic. FIGURE 6 illustrates one portion of the material utilized to teach students about the density of materials and their buoyancy in liquids. Notice that the student has requested that an experiment be conducted and he is presented with slide 66 which requests further direction in the experiment. The student controls the selection of various objects to be placed in a container filled with a liquid of his choice, and on his video monitor there is displayed a list of the different objects and liquids from which he can choose. Thus, the student can measure the volume of liquid displaced into the overflow container or determine the weight of the object suspended in the liquid.

Included in the list of objects that can be weighed is the overflow can and its contents, thus allowing the student to make use of Archimedes' principle. In the example shown in FIGURE 6, the student is attempting to determine the density of a "royal crown," one of the objects available in the simulated laboratory. The left side of FIGURE 6 shows a sequence of events that occurred when the student measured the overflow volume. The student initiated an experiment by operating the keyset button 2 in operation 64. Then by pushing a button labeled "1" the student chose to measure volume, and by operating the "1" button again, chose the crown which was immediately drawn on his storage tube and presented on his video monitor. This operation was accomplished by a character writing mode similar to that described in the tutorial logic sequence where numerals and letters were written on the storage tube.

The student then chose alcohol as the liquid in which the object was to be placed, and the programmer 34 through the output logic block 32 presented appropriate character writing information to allow the liquid levels in the overflow can and overflow container, the position of the object in the liquid, and the volume of overflow to be indicated on the students' video display monitor 20. Since the crown sank in the alcohol, the 45 cc. of overflow volume represents the volume of the crown. In a similar manner, the right hand side of FIGURE 6 illustrates the sequence of events that occurs and the corresponding slides presented when the student measures the weight of the crown in air. From the results of these two experiments the student is able to compute the density of the crown.

The student may present his answer in a similar manner as indicated for the tutorial logic so that the answer can then be judged. If the student is having difficulty, a help sequence could also be provided. It must be realized that the example of two types of teaching logics as shown in FIGURES 3 and 6 have only been presented as examples and various other teaching approaches can be formulated and written as instructions for the computer in the programmer 34 which will perform the teaching logics desired.

Thus, the system illustrated in FIGURE 2 which incorporates the principles of the present invention, presents an extremely flexible system capable of not only performing according to a variety of desired teaching logics, but also provides the ability to service a plurality of students with each student operating in an independent manner according to his own capabilities.

Detailed apparatus description

As has been mentioned previously the programmer 34 includes a general purpose computer which services all of the student stations. The following is a list of specifications of a computer which is capable of servicing at least 32 student stations in accordance with the embodiment of the invention to be hereinafter more specifically described.

Computer characteristics

Add Time _____microseconds__ 10
Capacity (48 bits each) _____words__ 32,000
Random Access Time (Memory) ____microseconds__ 5

Referring now to FIGURE 7, there is illustrated the detailed apparatus of the input scanner and logic block 30 which enables the computer to receive input data sequentially from the student stations. It must be realised, of course, that other apparatus may be utilized to perform this function, and the apparatus in FIGURE 7 is illustrated merely as one embodiment which has been used and found quite suitable for practicing the invention.

The input station address of each station is sequentially generated by a binary chain with a time base flip-flop 72 determining the scan rate—or the rate of sequential generation of the station addresses each consisting of five data bits. The time base flip-flop 72 has a pair of AND gates 74 and 76 coupled to the respective inputs of flip-flop 72. It might be mentioned here that the terms "flip-flop," "AND gates" and other types of logic circuits shown in the course of the following detailed description signify well known circuits which are utilized to perform logic functions. Although many publications disclose such basic logic circuits, for reference purposes one might refer to "Pulse and Digital Circuits," by J. Millman and H. Taub.

Each of the AND gates 74 and 76 has four input lines. These inputs consist of: (1) an $\overline{X}$ signal which is normally present on input lines 78 and 80; (2) a $\overline{Y}$ signal which is normally present on input lines 82 and 84; (3) a manual scan or stop indication on input lines 86 and 88 which is normally set by switch 89 to the scan position; and (4) an $A_0$ and $A_1$ delayed trigger on input lines 90 and 92. The AND gates 74 and 76 operate in the usual manner—all of the input signals must be present simultaneously in order for the AND gate to provide an output signal. During normal scanning operations when the binary chain is sequentially generating each of the station addresses, the signals $\overline{X}$, $\overline{Y}$ and "scan" will be present at each of the AND gates 74 and 76. The time base flip-flop 72 will be in either of its two stable states thus allowing either an indicated $A_0$ or $A_1$ delayed trigger to be present at one of the inputs to the AND gates so as to flip the state of flip-flop 72 and thereby provide either an $A_1$ or $A_0$ output indication. For instance, if the time base flip-flop 72 was in such a state that an $A_0$ indication appeared on output line 94, this indication would appear through the delay network 96 at the input line 90 of the AND gate 74. Since all four inputs would now be present at AND gate 74 an output pulse indication at the flip-flop input line 98 would provide an $A_1$ output indication on output line 100.

In the binary chain the $A_0$ and $A_1$ outputs of time base flip-flop 72 are directed to counter unit B which includes flip-flops 102 and 104. It may be noted that the $A_1$ signal appears at the inputs 106 and 108 of two AND gates 110 and 112 respectively. The remaining input lines 114 and 116 of AND gates 110 and 112 respectively are coupled to the respective outputs of flip-flop 104. Thus, when the $A_1$ indication is being generated by flip-flop 72, one of the AND gates 110 or 112 will be operated to trigger the flip-flop 102 and provide either a $B_0$ or $B_1$ output signal which appears at either of the output lines 118 or 120 of flip-flop 102.

After a delay of between 25 and 100 microseconds which is established by the delay networks 96, a delayed $A_1$ trigger is applied to AND gate 76 via line 92 to trigger the flip-flop 72 and provide an output $A_0$ on output line 94. This $A_0$ signal is applied to input lines 122 and 124 of respective AND gates 126 and 128. The AND gates 126 and 128 also have respective input lines 130 and 132 coupled to the $B_1$ and $B_0$ output of lines of flip-flop 102, so that with the $A_0$ signal present and either a $B_1$ or $B_0$ signal also present, either the AND gate 126 or 128 will be operated to trigger flip-flop 104. This reverses the polarity of input lines 114 and 116 which are coupled to the outputs of flip-flop 104, which will in effect ready either AND gate 110 or 112 for operation when an $A_1$ signal appears at these last mentioned AND gates. In other words, if AND gate 110 had been previously operated by the presence of an $A_1$ signal and the correct signal on input line 114, the subsequent presence of an $A_0$ signal serves to reverse flip-flop 104 and ready AND gate 112 for operation upon the next appearance of an $A_1$ signal on input lead 108. The subsequent presence of an $A_1$ signal and the correct polarity from flip-flop 104 on input line 116 of AND gate 112 will trigger flip-flop 102 to change the output of flip-flop 102 from $B_1$ to $B_0$ or vice versa. The $B_0$ and $B_1$ indications are coupled to following dual flip-flops similar to that shown as flip-flops 102 and 104 to generate, in a similar manner as previously described, $C_0$ and $C_1$ indications. Since this is merely a duplication of what has been previously described, this has been indicated in FIGURE 7 as the dashed lines to indicate that subsequent corresponding dual flip-flops generate $C_0$, $C_1$, $D_0$, $D_1$, and $E_0$, $E_1$.

In summary, time base flip-flop 72 produces sequentially $A_0$ and $A_1$ indications. The $A_1$ indications are utilized to trigger flip-flop 102 to produce sequentially either $B_0$ or $B_1$ signal indications. The $A_0$ output of flip-flop 72 triggers flip-flop 104 which in effect allows sequential triggering of the flip-flop 102 by the $A_1$ signal.

The resulting signal output from the time base flip-flop 72, flip-flop 102 and the remaining flip-flops are of the type shown in FIGURE 8. It is realized, of course, that while only the signals $A_1$ through $E_1$ have been illustrated in FIGURE 8, the corresponding $A_0$ through $E_0$ signals are merely the inverse of the illustrated signals. It may be noted that since there are five separate binary data signals present, the signals can be utilized to generate sequentially 32 distinct addresses. As shown in FIGURE 7, a series of 32 AND gates indicated in the figure as AND gates 134 through 136 each has a series of five input lines which are coupled to the signals $A_0$, $A_1$, through $E_0$, $E_1$ and thus represent the 32 possible combinations of these signals. As an example, it may be noted that AND gate 134 has input terminals coupled to the $A_0$, $B_0$, $C_0$, $D_0$, and $E_0$ output lines. This AND gate could be associated with Station 0. Similarly, AND gate 136 has five input terminals connected respectively to the output lines coupled to signals $A_1$, $B_1$, $C_1$, $D_1$ and $E_1$ and AND gate 136 could be associated with Station 32. Thus, as a particular combination of five signals is generated, this designates an input station address which will operate one of the AND gates 134 through 136.

The outputs from each of the address AND gates 134 through 136 are individually coupled to a corresponding one of 32 request AND gates indicated in FIGURE 7 as AND gates 140 through 142. Each of these request AND gates has 3 input lines. For example, AND gate 140 has an input line 144 to receive the particular input station address indication from AND gate 134 when the proper $A_0$ through $E_0$ five bit code is present. Another input line 146 of AND gate 140 consists of a station request indication which occurs when the keyset 18 in the station associated with AND gate 140 is operated. Another input to the AND gate 140 appears on input line 148 and prevents operation of AND gate 140, thereby also preventing the transfer of input data from a particular station to the computer. In normal operation a ready signal appears on the input line 148 so that the AND gate 140 can be operated when the inputs on lines 144 and 146 are also simultaneously present.

When a student at a particular station operates his keyset 18 by depressing one of the keys, this closes a contact 150 which initiates a keyset request indication on line 152. This sets the reset flip-flop 154 to ready input line 156 of AND gate 158, so that after approximately a five millisecond delay the keyset request indication also appears at AND gate input line 160. The output of AND gate 158 triggers a request flip-flop 162 to present a station request indication at input line 146 of the request AND gate 140. Upon the sequential generation of the input station address corresponding to the requesting station, which will appear on input line 144, AND gate 140 will transfer the keyset request signal to line 164 which is 1 of 32 input lines of OR gate 166. This signal operates OR gate 166 to immediately remove the $\overline{Y}$ signal from inputs 82 and 84 of AND gates 74 and 76 to stop the address scanning of the binary chain. After a 25 microsecond delay provided by delay network 168, input ready flip-flop 170 provides an output to the computer input on line 172 to indicate to the computer that a station is requesting service and the input data from the station is ready for transfer to the computer. The triggering of input ready flip-flop 170 also removes the operating $\overline{X}$ signal from AND gates 74 and 76 to lock the binary chain in the station address corresponding to the station initiating the request. The input station address consisting of five data bits identified as $A_0$ through $E_0$ on output lines 174 through 175 are sent to the computer to indicate the input station address of the requesting station.

Assuming that the input station address associated with signals $A_0$ through $E_0$ has been sequentially generated and is present at the input of AND gate 134, a keyset mode transfer signal on output line 178 is coupled to the inputs of 7 AND gates identified as 180 through 182. Thus, if a key on the particular keyset 18 has been operated to close one or more of the 7 contacts indicated as 184 through 186 associated with the particular key, an input signal will operate corresponding AND gates 180 through 182 to form a Key Code identifying the particular key operated and thus the operating mode requested. This Key Code is sent through corresponding OR gates 184 through 186 to AND gates 188 through 190. AND gates 188 through 190 are operated by the presence of a $\overline{Y}$ signal and the initiating key address from OR gates 184 through 186. This operates the corresponding flip-flops 192 through 194 which comprise the input data register to store the initial Key Code identifying the operated key. Output lines 196 through 198 couple the 7 bit Key Code from the input data register to the computer input.

Operation of one of the request AND gates 140 through 142 presents a keyset release signal on output line 200 which after a 30 microsecond delay in delay network 202 operates release AND gate 204 to trigger flip-flop 154 which provides a keyset reset signal on line 206 which is coupled to a solenoid 208 in the keyset 18 for resetting contacts 150 and 184 through 186.

Upon receiving the input data from a requesting station, the computer provides an input data résumé indication which is coupled to line 210 to trigger flip-flop 170 and operate the time base flip-flop 72 so that sequential scanning of the input station addresses can resume. An adjustable timing circuit 212 is provided for varying the scanning rate by controlling the turn on time of the delay networks 96 which therefore controls the coupling of the $A_0$ and $A_1$ delayed trigger signals into the AND gates 74 and 76.

Figure 9:
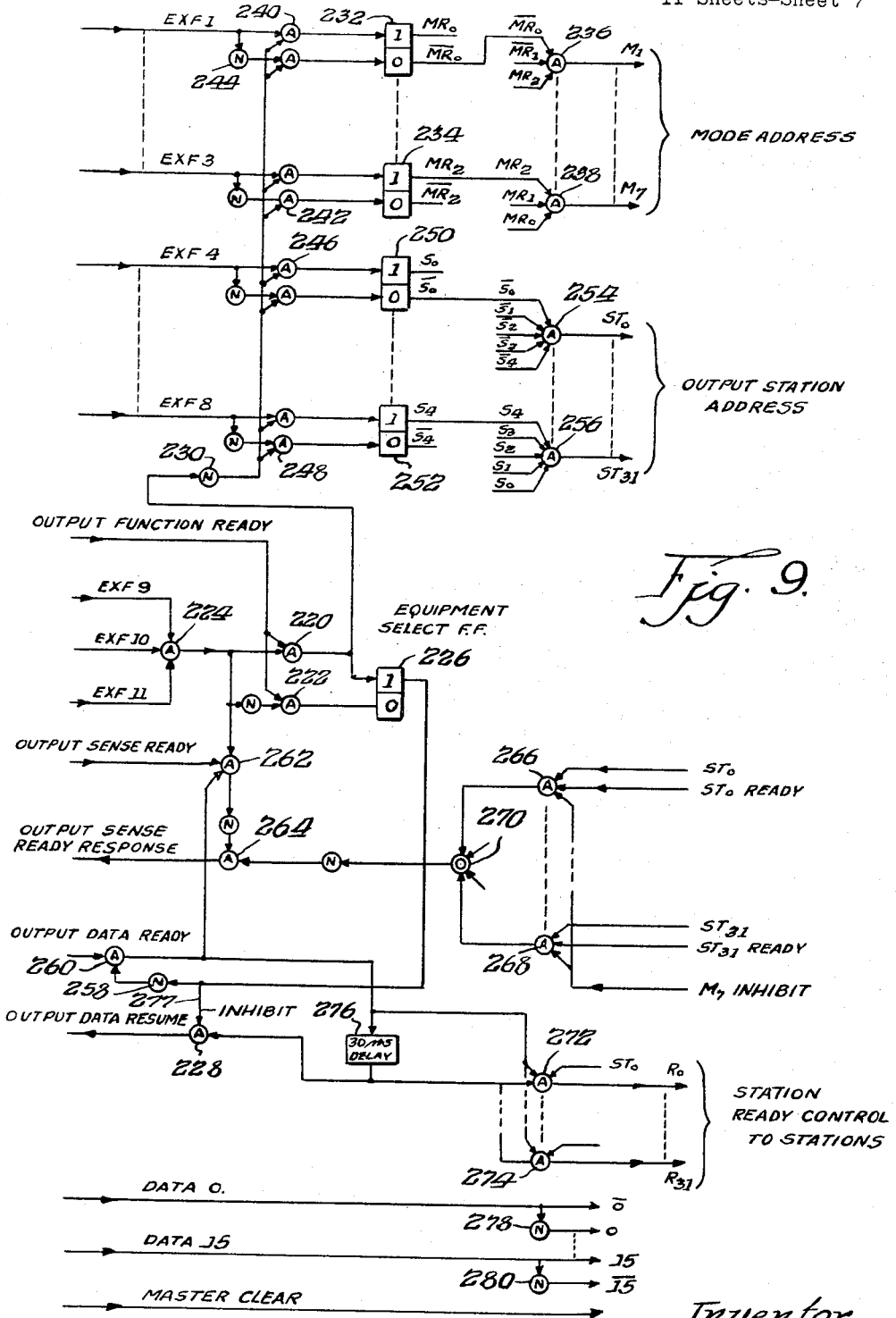
FIGURE 9 is a schematic illustration showing an apparatus including logic circuits for coupling the control units to a selected station with the required mode operations indicated.

Whereas the transfer of input information from all the student stations to the computer is provided on a sequential basis, the transference of output information from the computer to the particular desired station is provided on a selected basis. Referring now to FIGURE 9, there is illustrated the output addressor and logic apparatus 32 which is one example of apparatus capable of selectively transfering data from the computer to the desired station.

After the computer has performed the necessary operations on the input data received from a particular station, an indication identified as an Output Function Ready signal is sent from the computer control unit to the output selecting and logic apparatus 32. This function ready indication is coupled to AND gates 220 and 222 which also receive an operating signal from AND gate 224 derived from control signals indicated as EXF–9, 10 and 11 in FIGURE 9. The EXF 9–11 signals are coupled from the computer control unit. Either AND gate 220 or 222 will be gated to trigger an equipment selected flip-flop 226 which will change stable states to inhibit the operation of AND gate 228 and prevent the transmitting of output data from the computer until certain other operations have been performed.

When AND gate 220 has been gated on this information is transferred through an inverting NOT gate 230 to ready a series of AND gates connected in pairs to each of the EXF 1 through EXF 8 control lines from the computer control unit. The EXF 1–3 lines operate corresponding flip-flops 232 through 234 to generate mode request signals indicated as MR and $\overline{MR}$. The outputs of the three binary flip-flops 232 through 234 are combined in the AND gates 236 through 238 to generate one of the seven mode addresses M1 and M7. The correct EXF 1–3 control signals are programmed so as to present the proper signals at the AND gates 240 through 242 in order that the proper three bit code inputs to the AND gates 236 through 238 will operate a corresponding one of these last mentioned AND gates to provide the requesting mode M1 through M7. It may be noted that each of the input lines EXF 1–3 includes a NOT gate such as NOT gate 244 in order that the flip-flops 232 through 234 may be triggered from either of the flip-flop inputs.

Similarly, the output of NOT gate 230 combines with the control signals EXF 4–8 at the AND gates 246 through 248 to provide the output station address corresponding to the station to which the computer desires to selectively transfer processed data. For this purpose, five flip-flops 250 through 252 each corresponding respectively to the input control lines EXF 4–8 provide a series of binary outputs which are combined in AND gates 254 through 256 each having five input lines from a corresponding one of the five flip-flops 250 through 252. In operation, the computer control unit generates the correct EXF 4–8 signal combination to operate one of the two AND gates coupled to each line so that the desired output of the binary flip-flops 250 through 252 will be set up. This operation will generate a unique five bits which identifies a particular selected student station to operate one of the 32 AND gates 254 through 256 and thereby provide the selected output student address from the 32 student addresses indicated as $ST_0$ through $ST_{31}$ in FIGURE 9 for the respective student stations 0 through 31.

A check is now made to see whether the particular station to which the output information is to be sent is in a ready position to receive the information. This operation involves the necessary correct operate indications from the control lines in FIGURE 9 identified as Output Sense Ready, Output Sense Response, Output Data Ready and Station Ready (identified as $ST_0$ Ready through $ST_{31}$ Ready). The initial operation of flip-flop 226 coupled through NOT gate 258, along with an output data ready indication from the computer control unit, combine to operate AND gate 260 and transfer this indication to AND gate 262. The simultaneous presence of an Output Sense Ready signal from the computer control unit and a "go" indication from EXF 9–11 act to operate AND gate 262 to prime AND gate 264 for operation should the desired one of the request ready AND gates 266 through 268 operate. The 32 output station address lines from respective AND gates 254 through 256 are each coupled to a corresponding request ready AND gate 266 through 268 and these last mentioned AND gates also have a corresponding input from each of the stations which gives an indication as to whether certain equipment in the station is in a ready condition to receive data from the computer. The 32 AND gates 266 through 268 also each have an input line referred to as $M_7$ Inhibit in FIGURE 9, which it may be assumed for this illustration presents an operate signal to each of the AND gates. Thus, normally all of the stations will be ready and an Inhibit signal will not be present so that 2 of the 3 inputs to each of the AND gates 266 through 268 is in an operate condition, and when the particular AND gate receives the generated output station address corresponding to the selected station the corresponding AND gate 266 through 268 will operate and the output signal will be transferred through an OR gate 270 to AND gate 264. The presence of both input signals on AND gate 264 will indicate that the station equipment is ready and the output data from the computer is ready by sending an output sense ready response to the computer control unit.

When the output data ready indication is received from the computer at the AND gate 260, the flip-flop 226 was in the correct stable state so that AND gate 260 was operated to enable a ready signal to be sent to AND gate 262. The output of AND gate 260 is also connected in two different manners to a series of 32 AND gates 272 through 274 which are used to transfer a Station Ready Control signal identified as one of the output lines $R_0$ through $R_{31}$ to the selected station. One input of each of the AND gates 272 to 274 consists of a simultaneous output of AND gate 260, whereas another input of the AND gates 272 through 274 consists of a 30 microsecond delay output of AND gate 260 provided by delay network 276. Upon the presence of both the output data ready signal and the 30 microsecond delayed signal, two of the three inputs of AND gates 272 and 274 will be in an operate ready condition. A single one of the 32 AND gates will be operated by a trigger signal from the Output Station Address corresponding to the selected station. This will present a Station Ready Control signal to certain equipment in the selected station, such as the storage tube, the video switch, and to other special stimuli.

The delay network 276 delays the output data ready indication a sufficient amount of time to allow the triggering of equipment select flip-flop 226 through AND gate 222 to provide a transmit signal to AND gate 228 on input line 277, which combines with the delayed output data ready signal to transmit an output data resume indication to the computer. In the logic diagram shown in FIGURE 9, there has been omitted various emitter follower circuits which are used to provide certain desired impedance conditions, and line driver circuits which are utilized to provide the signal amplitude desired. These type of circuits are well known, and their use in the logic diagram to provide the conditions stipulated can readily be accomplished in a known manner.

Upon receiving the output data resume indication from the logic apparatus 32, the computer provides proper addressing data on certain ones of sixteen data lines identified as data lines 0 through 15 in FIGURE 9. The logic apparatus 32 incorporates NOT gate 278 through 280 for each of the data lines to further provide the inverse signal of each of the data lines 0 through 15.

The detailed apparatus which has heretofore been described provides the apparatus necessary for transferring input data from 32 student stations and upon subsequent processing of this data by the programmer 34 transference of this processed information to the selected station. The apparatus shown in FIGURE 2 is capable of selecting slides from the slide storage and scanner 22 for display on the video monitor 20. The following detailed description will illustrate the apparatus providing a conversion of the information present on slides into video form, and also the operating apparatus necessary for selecting a video transmission line to display a particular slide to a selected student. It must be especially noted that the apparatus shown in FIGURE 2 is capable of displaying any of the slides in a selective manner to any of the students. The system is also capable of allowing each student independently to view the same slide.

Figure 10:
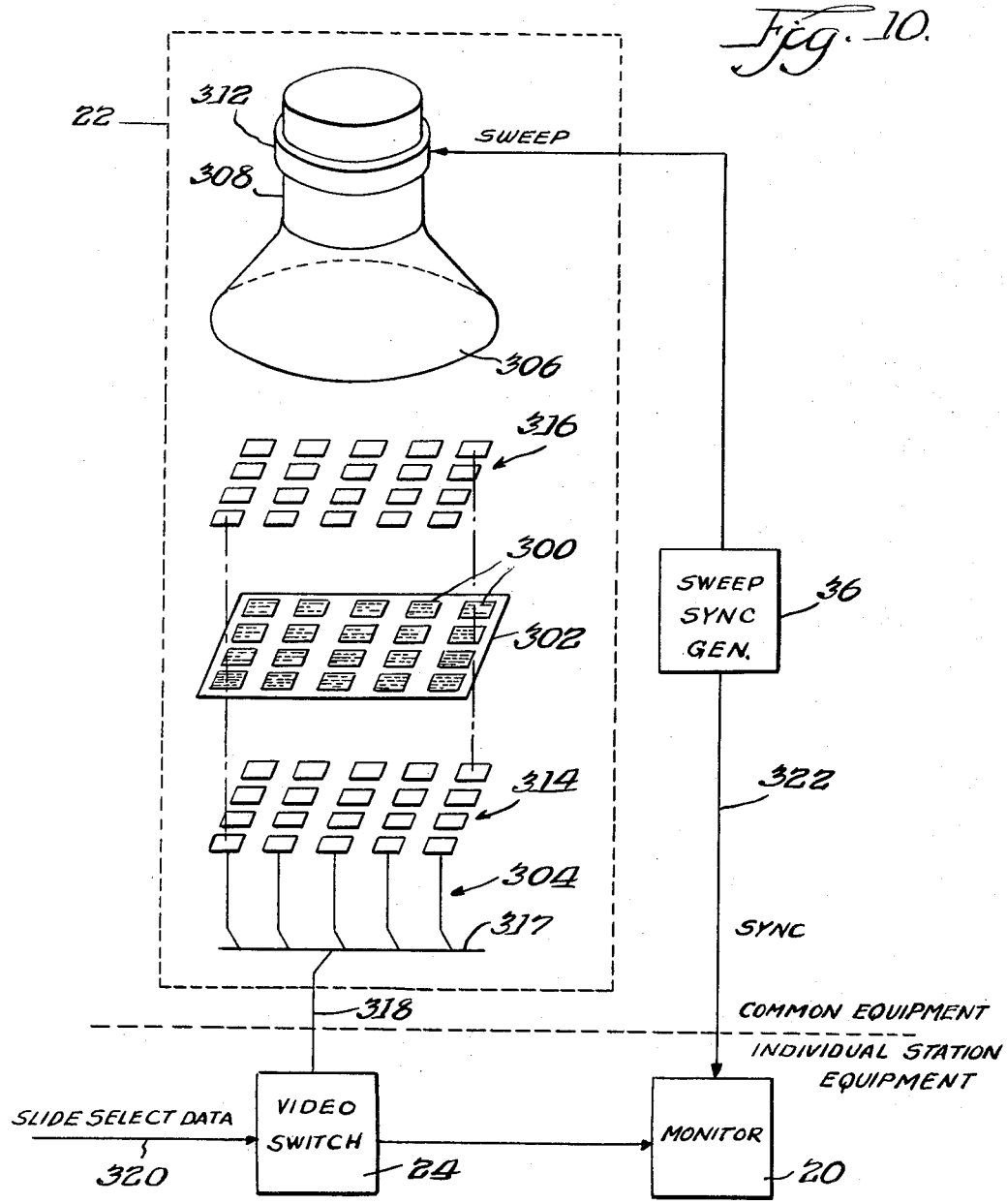
FIGURE 10 is a pictorial diagram of a slide scanner unit for converting information on slides into video signals.

Referring now to FIGURE 10 there is illustrated a diagrammatic view of the slide storage and scanner 22 which converts information present on a number of 35 millimeter slides 300 mounted on a transparent slide holder 302 into video information on a corresponding plurality of video transmission lines 304. The slide storage and scanner unit 22 includes a typical flying spot scanner arrangement. In this arrangement the slides 300 are illuminated by a "flying spot" light source developed on the face 306 of a cathode ray tube 308. The moving spot of light is made to follow a conventional raster pattern by application of a sweep signal from the sweep sync generator 36 which is applied to a deflection coil 312 of the cathode ray tube 308.

A plurality of photo tubes 314, one for each of the slides 300 receives transmitted light from the moving spot on the cathode ray tube face 306 which passes through the slides 300 on the transparent sheet 302 so that the corresponding outputs of the photo tubes 314 on the video transmission lines 304 consist of video signals proportional to the subject brightness and the subject position of the slides. A series of lenses 316 has been provided for focusing light on the cathode ray tube face 306 through a corresponding slide 300 and to a corresponding photo tube 314. Suitable amplifier circuits can be provided for multiplying the signals from the photo tubes 314 before application on the video lines 304. Each of the video lines 304 thus contains video information corresponding to one of the slides 300.

All of the video transmission lines 304 are grouped on a distribution panel 317 for coupling to all of the student stations. In FIGURE 10 there is illustrated a multiple line 318 which couples all of the video signals from the lines 304 to a video switch 24 at one of the student stations. Information arriving on slide select data line 320 is capable of operating the video switch 24 so as to select one of the video lines 304 which is then coupled to the monitor 20. A sync control line 322 from the common sweep sync generator 36 is coupled to all of the monitors 20 so that the sweep position of the spot on the face 306 of the cathode ray tube 308 can be synchronized to the position of the sweep on the video monitor 20.

A slide storage and scanner 22 was constructed as described herein with the capability of converting information on 122 slides into video information on 122 of the 128 separate video transmission lines. The constructed scanner unit utilized two separate flying spot scanner systems each including a cathode ray tube, lenses, and photo tube multipliers with a 61 slide conversion capability.

Figure 11:
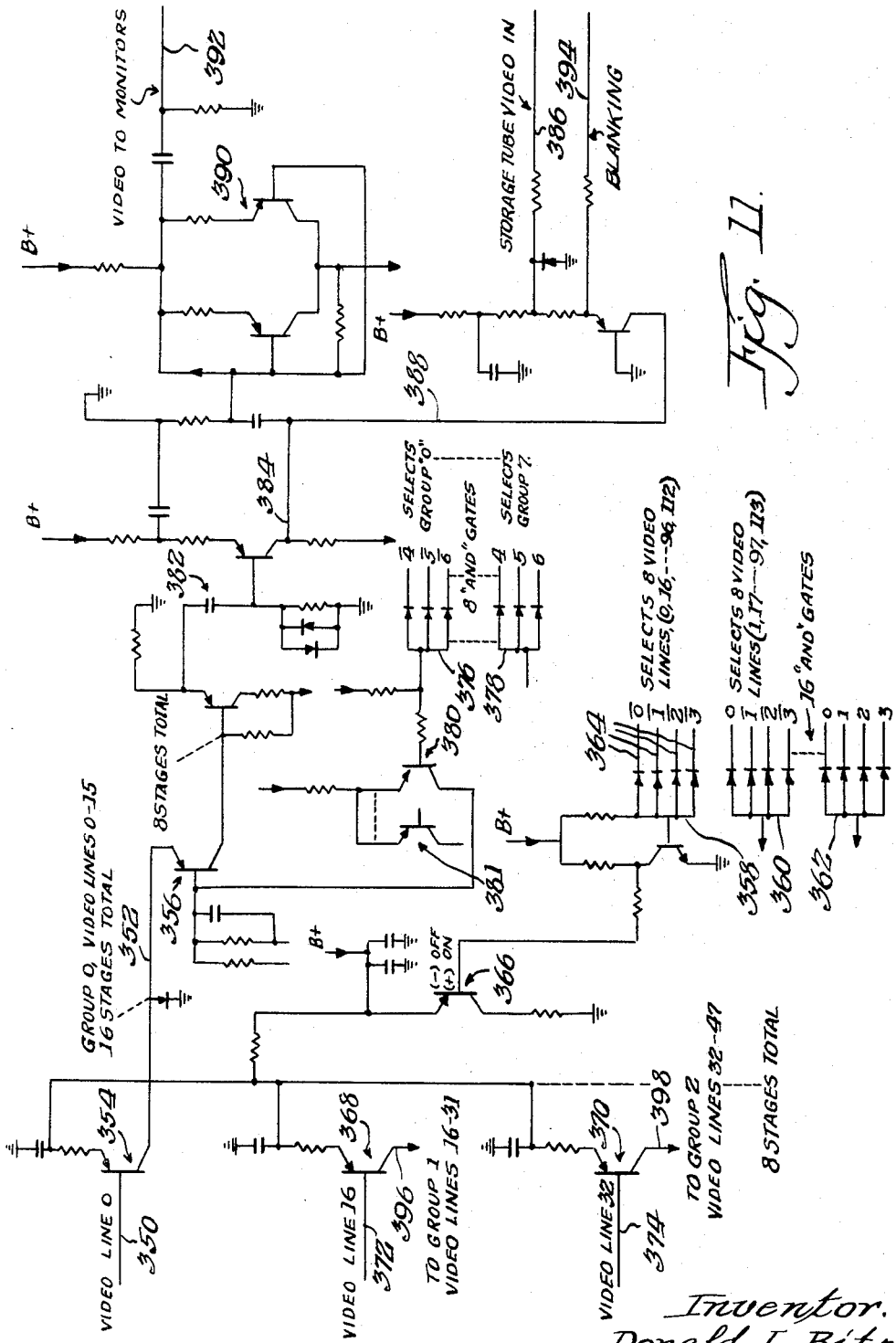
FIGURE 11 is a schematic diagram illustrating apparatus for selecting a video line and thus a particular slide for display to a selected student, and further illustrates apparatus for presenting video information in a superimposed manner to the students.

The video switch 24 at each of the student stations was coupled to all of the 128 video lines available from the slide storage and scanner 22 in order that the particular slide desired and the corresponding video line could be coupled to the individual station monitor 20 for display thereon. Referring now to FIGURE 11 there is illustrated one representative portion of the video switch 24 which enables the selecting of one of the 128 available video lines at each of the student stations. FIGURE 11 also illustrates the apparatus forming the summing circuit for superimposing on the monitor 20 the video signals from video switch 24 and from the character video on storage tube 28. It must be understood, of course, that each of the student stations contains the apparatus illustrated in FIGURE 11 so as to enable each student to select and view information independently of the other stations.

In the video switch, the 128 input video lines are divided into eight groups of 16 lines each. Slide select data from the computer control unit consists of seven data bits. Three of the data bits are utilized to select one of the eight groups; the remaining four data bits being utilized to select one of the 16 video lines in the selected group. As an example of apparatus which performs this selection, specific reference may be had to FIGURE 11 wherein there is shown a transistor input line 350 corresponding to video line 0, which is one of the video transmission lines in group 0. As indicated on transistor output line 352, group 0 consists of 16 stages coupled individually to video lines 0 to 15 in a similar manner to that illustrated for transistor input line 350 and transistor 354. Thus, all the input lines of group 0 representing video lines 0 to 15 are present on line 352 at the emitter input of a transistor 356. Each of the 16 video transmission lines 0–15 is coupled to a corresponding one of 16 AND gates indicated as 358, 360, to 362. The inputs to the AND gates such as input lines 364 of AND gate 358 are coupled to the computer control unit. Thus, when a particular slide is to be selected, the computer control unit will transmit a four bit data code to actuate one of the 16 AND gates 358–362 which will turn on a transistor such as transistor 354 in each of the 8 groups 0–7.

For example, the transmission of a data bit code $\bar{0}, \bar{1}, \bar{2}$ and $\bar{3}$, will actuate AND gate 358 and coupled through gating transistor 366 will turn on transistor 354, transistor 368, and transistor 370, to respectively couple into the video switch video line 0 of group 0 on input line 350, video line 16 of group 1 on input line 372, and video line 32 of group 2 on input line 374. The four bit data code has thus selected one video line out of 16 video lines in eight separate groups. There remains now the selection of the group containing the desired video line.

This is accomplished by a three bit code which enables the selection of one of the eight groups each associated with the AND gates 376 to 378. Each of the eight AND gates 376 to 378 is coupled to a corresponding one of eight driver stages such as 380 to 381. Also, each of the drivers 380 to 381 are coupled to a group gating switch, similar to transistor 356 which operates as a switch for group 0. Each of the AND gates 376 to 378 are associated with a corresponding one of the groups 0–7 and can be operated by a corresponding three bit code from the computer control unit. Thus, assuming that the video lines associated with group 0 are to be selected, a data bit code of $\bar{4}, \bar{5}$ and $\bar{6}$ operates AND gate 376 and driver 380 to switch on transistor 356. This enables the selection of slide 0 associated with video line 0 in group 0 to be gated through transistor 356 and through suitable coupling and amplifying circuits 382 to be presented on the video switch output line 384.

The slide video on output line 384 superimposed on the storage tube video is presented through input line 386 on input line 388 to suitable coupling circuits 390. This superimposed video is directed to the individual monitor 20 on summing circuit output line 392. Input line 394 is also provided for blanking of the video monitor 20.

In order to fully understand the slide selection as illustrated by FIGURE 11 there is indicated examples of some of the other 16 AND gates which individually selects groups of eight video lines each. For example, AND gate 360 provides the selection of video lines 1, 17 . . . 97 and 113. Video line 1 is in group 0 and is coupled through a transistor similar to transistor 354 to the common group 0 output line 352. As has been described group 0 is under control of AND gate 376. Thus, if the slide corresponding to video line 1 is desired for viewing, the central computer is instructed to present the data bit 0, $\bar{1}$, $\bar{2}$ and $\bar{3}$, which will actuate AND gate 360 to select the eight video lines 1, 17 . . . 97 and 113 which are each in separate groups. Simultaneously, AND gates 376 would be operated to select group 0 within which the desired video line 1 resides.

It may be noted from FIGURE 11 that the video lines 16 and 32 which are under control of AND gate 358 are each located in separate groups: video lines 16–31 being coupled on group 1 output line 396 and video lines 32 through 47 on group 2 output line 398.

Figure 12:
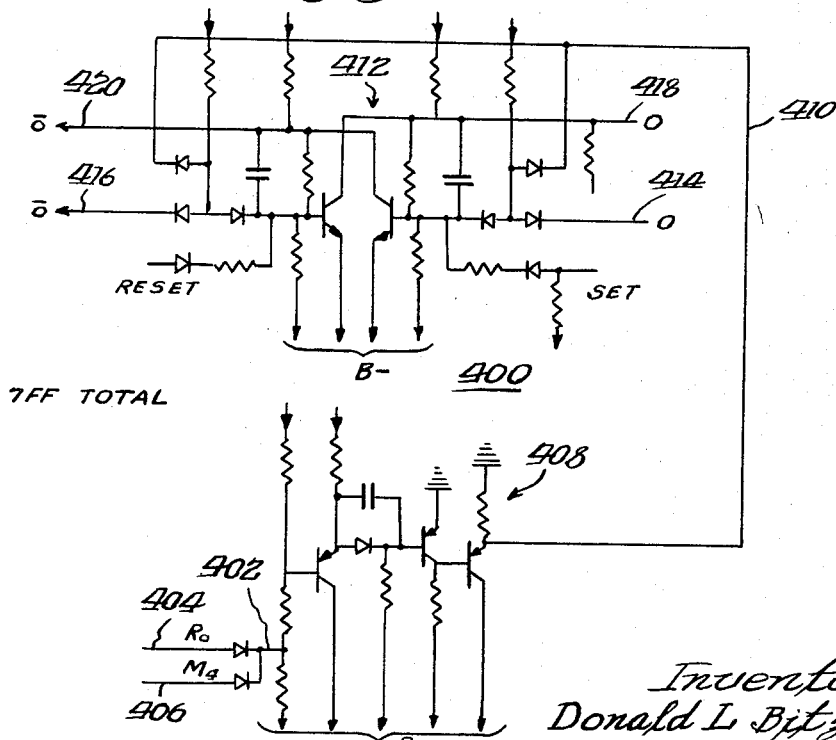
FIGURE 12 is a schematic diagram illustrating a portion of the video switch at each student station which is selected by the control unit, and also illustrates a register for receiving the Slide Address from the control unit.

It can be seen from the foregoing description that each slide is identified by a corresponding Slide Address consisiting of seven data bits which selects one of the 16 AND gates 358 through 362 and one of the eight AND gates 376 through 378. This seven bit Slide Address is derived from the data lines 0 through 15 shown in FIGURE 9 which are coupled to the central computer. Since the central computer is servicing a number of student stations, it would be advantageous to have these data lines coupled to the computer for only short periods of time. Also, the particular video switch 24 associated with the requesting student station must be properly identified so that the proper Slide Address can be transferred thereto. Referring now to FIGURE 12 there is illustrated an example of apparatus accomplishing the above mentioned desired operations.

When it is desired to transmit data from the computer to any of the student stations, FIGURE 9 illustrates the generation of a corresponding Output Station Address so that the particular Station Ready Control signal can be transmitted to the particular station desired. In FIGURE 12 there is illustrated a slide register 400 which includes AND gate 402 having an input line 404 coupled to the output of AND gate 272 illustrated in FIGURE 9 through which there is transmitted the Station Ready Control signal ($R_0$) for the station 0. There is a corresponding slide register 400 associated with each of the video switches 24. The $R_0$ signal is generated to select the equipment associated with student station 0. In order to designate the fact that at the particular student station a slide select operation is to be performed, the computer also generates, as illustrated in FIGURE 9, a slide select mode ($M_4$) signal which is coupled to input line 406 of AND gate 402. The presence of both the control signal $R_0$ and the slide select mode indication $M_4$ operates AND gate 402, and through a coupling circuit 408 a control signal is directed on an input line 410 of a flip-flop 412. The flip-flop 412 is associated with data bit 0, having input lines 414 and 416 coupled respectively to the data lines 0 and $\bar{0}$ of the output addressor and logic apparatus 32 shown in FIGURE 9. The output lines 418 and 420 of the flip-flop 412 are coupled to the corresponding 0 and $\bar{0}$ input lines of AND gates 358 through 362. Thus, the computer operating under programmed instructions utilizes the $R_0$ and $M_4$ signals to select a station and the mode of operation, and to control or trigger the flip-flop 142 to set up the proper 0 and $\bar{0}$ data bits as required to select a desired slide. A total of seven flip-flops similar to that shown as flip-flop 412 are utilized, one for each of the data bits in the Slide Address. Thus, as the required Slide Address is generated by the computer and the corresponding $R_0$ and $M_4$ signals are received at the station 0 video switch, the Slide Address is transferred into seven flip-flops which serve as a memory or register of the Slide Address thereafter. The Slide Address is then coupled to the AND gates 358 through 362 and 376 through 378 for selecting the desired slide as described in the description connected with FIGURE 11, and the computer data lines are then available for servicing of other student stations.

Referring now to FIGURES 13–15 there is illustrated an example of apparatus for writing and erasing characters on the student's video monitor 20 under control of the student operating his individual keyset. As mentioned previously, the student requests that these operations be performed by operating his keyset, and the central computer sends out mode control signals and corresponding data to perform the operations requested. Under control of the Storage Tube Control Mode 1 data, characters may be written on the storage tube; the written characters may be read out of the storage tube and into the video monitor 20; the storage tube may be entirely erased; or selected portions of the storage tube may be erased.

In writing characters on the storage tube, Character Base Position Mode 2 information consisting of a data word of sixteen bits is set from the central computer and through the output logic apparatus 32 to the X–Y base address and character points digital to analog converter 26 for conversion from digital to analog information to operate the storage tube 28. This conversion from digital to analog form is required to operate the storage tube and the cathode ray tube monitor which both are analog operating units. FIGURE 13 illustrates a portion of this converter 26. Eight bits of the Mode 2 data are utilized to designate the X base position and the remaining eight bits are utilized to designate the Y base position. The Mode 2 data designates a base position or point on the storage tube which is utilized by the Mode 6 character point information as a reference during the writing operation.

Referring more specifically to FIGURE 13 there is indicated the Mode 2 Y base address data information on input lines 450 through 452 which are coupled from the output logic apparatus 32 on data lines 0 to $\overline{7}$. The remaining Mode 2 base position information is presented to input lines 454 through 456 corresponding to data lines 8 through $\overline{15}$, and designates the X base address. In effect, the writing surface of the storage tube 28 is divided into 256 by 256 orthogonal grid lines and the Mode 2 data specifies X and Y grid lines whose intersection determines the reference position of a finer 64 by 64 grid in the coarser grid. Each of the data input lines 450 through 452 and 454 through 456 is coupled to one input of AND gates 458. The remaining AND gate input lines 460 are coupled to a control signal from an AND gate 462. Control AND gate 462 provides an output signal whenever the logic apparatus 32 provides an Output Data Ready indication and a simultaneous Mode 2 indication which are coupled respectively to input lines 464 and 466 of the AND gate 462. A base address register 468 is provided for each of the data bits to form a register for the X–Y base address.

Since the base addresses are in digital form, this information must be converted into analog form for operating the storage tube. In the illustration of FIGURE 13, this is accomplished by a pair of resistance ladder networks 470 and 472. The ladder networks operate in conjunction with a series of current generators or switches 474 which couple the respective base address registers 468 to the particular X and Y ladder network. The ladder networks 470 and 472 include a series of resistors connected in a ladder network in a known manner for digital to analog conversion with the switches 474 coupled to particular designated points in the ladder network. The ladder network and the current generators or switches are arranged to convert the base address and digital information to a voltage level in analog form for operating the storage tube. As an example, the presence of a data bit 0 on input line 450 and a corresponding control signal on control line 460 will operate AND gate 458 and the flipflop and base address register 468 to operate and couple the switch 474 and network 472. Assuming that this is the high voltage end of the ladder network 472, this will establish a certain voltage level to the storage tube on ladder output line 476. There are eight switches 474, one for each of the data bits 0 through 7 and each of the switches is coupled to a different resistance level on the ladder network 472. Thus, if a data bit 7 is coupled to the converter 26, a corresponding switch 474 will operate to couple a predetermined amount of resistance between the ladder output line 476 and a reference voltage supply. This, of course, will change the analog voltage output to the storage tube. In this manner, by properly coupling the amount of resistance in the ladder network, the desired analog voltage level can be generated for each of the digital data bits input. A precision follower 478 is provided for impedance coupling the ladders 470 and 472 to the storage tube 28. Thus, by presenting the proper 16 bit data word which identifies the desired grid base position of the character to be formed, an analog X and Y base address is formed by the converter 26 for application to the X and Y sweep circuits of the storage tube.

Once the base address or position of the character has been specified by the Mode 2 data, which has now positioned the 64 x 64 grid, it is necessary to now form the character by utilizing the base address as a reference point. This operation concerns Mode 6 data and involves the writing of the character in a point by point manner, with each of the points on the grid pattern being specified by a 12 bit data word designating X and Y positions. The 0–5 data lines of output addressor and logic apparatus 32 are coupled respectively to Mode 6 input lines 480 through 482 to denote the Y position of a spot in the character. In a similar manner, data lines 6–11 are coupled to Mode 6 input lines 484 through 486 to designate the X position of the spot in the character. These Mode 6 input data lines 480 through 486 are each coupled respectively to a switch 488 similar to switches 474 to convert the digital information on character point into a corresponding analog voltage level for operating the storage tube. The characters are thus formed in a point by point manner with each point being identified by X information from data bits 6 through 11 and Y information from data bits 0 through 5. This character point information is also presented to the X and Y sweep circuits of the storage tube, and as the corresponding analog voltage is presented to the storage tube for each point a Mode 6 control signal operating into the storage tube control grid element enables the operation of the storage tube and the "writing" of each character spot on the storage tube.

It may be noted from FIGURE 13 that the base address data is coupled to the high current generators 474, whereas the character write data is coupled to the low current generators 488. The ratio of the currents established by these current generators is proportionate to the ratio of the grid pattern sizes.

Referring now to FIGURE 14, there is illustrated a storage tube logic diagram which enables information to be presented to and taken from the storage tube 28. The storage tube 28 is a well-known device having a screen grid element, a control grid element and a signal electrode element coupled respectively to lines 500, 502 and 504. For convenience, these reference numerals will be utilized to also indicate the storage tube elements. The storage tube 28 also requires a voltage supply for the filaments, and a focus control circuit is also provided. However, for clarity, these well-known circuits have not been shown. The X and Y yoke drivers 506 and 508 are well known deflection circuits utilized to sweep the electronic beam in the storage tube 28 in both the X and Y orthogonal directions. The X and Y yoke drivers are coupled respectively to X and Y function circuits 510 and 512 which include a series of relay contacts associated with relay coils 514. The inputs to the function circuits 510 and 512 include corresponding X and Y information for performing writing, erasing or reading operations in the storage tube 28. Specifically, input lines 516 and 518 are coupled to X and Y base position and character point information from the X and Y ladder networks 470 and 472 in FIGURE 13; and input lines 520 and 522 are coupled to suitable X and Y sweep voltages from the sweep sync generator 36. These input lines along with input lines 524 and 526 associated with the X and Y selective erase functions are coupled through appropriate relay contacts in function circuits 510 and 512 to the X and Y yoke drivers 506 and 508. The relay contacts are associated with relays 514 and thus the function to be performed by the storage tube 28 is determined by operation of the proper relays in the relay group 514.

The relays 514 determine the X and Y sweep deflection of the storage tube electron beam according to the operation desired. The TV sweep relay group 528 including relays identified as $K_{15}$ through $K_{22}$ operates corresponding relay contacts in the X and Y function circuits 510 and 512 to couple sweep voltages from X and Y sweep sync generator 36 to the corresponding storage tube deflection coils in the X and Y yoke drivers 506 and 508. The TV sweep relay group 528 is operated during reading and full erasing operations on the storage tube 28. The reading operation consists of transferring previously written information on the storage tube screen 500 out to the storage tube signal electrode 504 which is coupled to a suitable video pre-amp and bottom clip circuit 530 and thence on video output line 532 to the monitor 20. Operation of the relay group 528 provides the X and Y sweep voltages from sweep sync generator 36 to properly deflect the electron beams in storage tube 28 and enable the transference of video information on storage tube screen 500 to the signal electrode 504 to be presented in a synchronized manner on the monitor 20.

Similarly, the X and Y sweep voltages are presented to the storage tube X and Y deflection coils by operation of the relay group 528 when it is desired to fully erase the storage tube screen 500. A selective erase relay group 534 controls corresponding relay contacts in the X and Y function circuits 510 and 512 to couple X and Y selective erase deflection voltages on input lines 524 and 526 which are derived from ladder network outputs shown in FIGURE 15 to the storage tube deflection coils. The relays in this last mentioned group are identified as $K_{11}$ through $K_{18}$ and control relay contacts with corresponding similar identifications illustrated in the X and Y function circuits 510 and 512. During these selective erase operations, deflection voltages on input lines 524 and 526 provide a small raster to effectively erase the desired character. Finally, it may be noted that a write relay group 536 includes relays identified as $K_{13}$ through $K_{20}$ having similarly identified relay contacts in the X and Y function circuits 510 and 512 for coupling the proper storage tube deflection voltages from the X and Y ladder output lines in FIGURE 13 on input lines 516 and 518 to the storage tube deflection coils. During the writing operation the storage tube electron beam is moved in a point by point fashion under control of the X and Y ladder network outputs illustrated in FIGURE 13. It must be realized that what has been described are the means for controlling deflection coils of the storage tube 28 in order to deflect the electron beam in a manner required to perform the desired writing, reading, erasing, or selective erasing operations on the storage tube. There is also required the proper control of the storage tube elements and the proper timing of operations of the relays in the group 514 so that the desired operations can be performed on the storage tube 28.

For this purpose, there is provided the mode control signals identified as Mode 1 on input line 538, Mode 6 on input line 540, Mode 7 on input line 542, and data input lines 544 through 546 coupled to the corresponding output lines of the output address and logic apparatus 32.

When the particular station has been selected by the computer for the transference of data thereto, a Station Ready Control signal identifying the particular station is generated by the output logic apparatus 32. FIGURE 14 illustrates that the storage tube 28 and the associated logic control circuits for station 0 receive the corresponding Station Ready Control signal $R_0$ on input line 548. The $R_0$ control signal on input line 548 combines with a Mode 1 indication on input line 538 to operate an AND gate 550 and present an operate condition via line 552 to the input lines 554 through 556 of AND gates 558 through 560. The data bits to be presented by the central computer to the data input lines 544 through 546 is dependent on the type of operation to be performed on the storage tube in accordance with the following code.

TRUTH TABLE.—DATA vs. DEFLECTION SIGNALS

|  | Mode 1 data | TV relays | S.E. relays | Write relay |
|---|---|---|---|---|
| SE | 0 0 0 | Open | Closed | Open |
| Read | 0 0 1 | Closed | Open | Open |
| Write | 0 1 0 | Open | Open | Closed |
| (Read) | 0 1 1 | Closed | Open | Open |
| Erase | 1 0 0 | Closed | Open | Open |
| (Read) | 1 0 1 | Closed | Open | Open |
| Do | 1 1 0 | Closed | Open | Open |
| Do | 1 1 1 | Closed | Open | Open |

The data lines 0 and $\overline{0}$ after operating the corresponding AND gates in conjunction with the Mode 1 control signals are coupled to a read flip-flop 562 having outputs identified as $0_{ff}$ and $\overline{0}_{ff}$ on output lines 564 and 566 respectively. In a similar manner a write flip-flop 568 operates from data lines 1 and $\overline{1}$, an erase flip-flop 570 operates from data line 2, and a blanking flip-flop 572 operates from data line $\overline{2}$.

The output of the flip-flops 562, 568, 570 and 572 are coupled both to the relay driver circuits 574 to control the deflection of the electron beam in the storage tube 28, and these outputs are also coupled to various storage tube element control circuits. For instance, during a writing operation a relay driver 576, provided for operating the relay coils in write relay group 536, is operated through an AND gate 578 under the control of data inputs $\overline{0}_{ff}$, $1_{ff}$ and $\overline{2}_{ff}$. When these control signals are present the relay driver 576 will operate the relays in relay group 536 and close the corresponding relay contacts. As indicated in FIGURE 14, this operation will operate the write relay contacts $K_{13}$ and $K_{14}$ in the X function circuit 510, and will also operate the $K_{19}$ and $K_{20}$ write relays to operate the corresponding relay contacts in circuit 512 in order to couple lines 516 and 518 and the corresponding base position and character point information to the deflection coils of storage tube 28. Also, a Mode 6—Write Character Point instruction on input line 540—is coupled with the $R_0$ indication on line 548 and a $1_{ff}$ indication on line 580 to send a turn on pulse to the storage tube grid 502. This turn on or write pulse is delayed approximately 25 microseconds by delay network 584, in order to allow a suitable turn on pulse to act on the storage tube control grid in accordance with the 30 microsecond pulse width of the incoming $R_0$ signal. Relay $K_1$ in relay group 536 is also operated to enable the storage tube screen 500 to be coupled to a suitable writing voltage. This operation is provided by a $\overline{0}_{ff}$ data bit to relay driver 585 which operates relay $K_2$ to connect the storage screen 500 to $K_2$ relay contact 586. Thus a suitable writing voltage is coupled to the storage screen 500 through a $K_1$ relay contact 588, through the $K_2$ relay contact 586, and thence to the storage screen 500. The output of the relay driver 585 is also coupled to a delay read driver 590 and via line 592 is coupled to the video pre-amp 530 to disable the video and prevent a reading out of the storage tube video into the monitor until the entire character has been written. When this has occurred, Mode 1 read data is presented to the logic circuit in FIGURE 14 to enable the information on the storage tube to be read into the station video monitor.

It must be realized, of course, that the above operation which involves deflecting the electron beam according to character point information and presenting a turn on pulse to the storage tube grid for each character point until the entire character has been formed on the storage tube screen—this entire character writing operation is performed almost instantaneously upon the student depressing or operating the key in his keyset corresponding to the character which he wants written on his monitor. It has been found that reed switches perform quite capably in the relay group 514 so as to insure this almost instantaneous character writing operation.

During an erase operation when the entire storage tube screen area is to be erased, appropriate data bits are presented on data input lines 544 through 546 by the computer in accordance with programmed instructions to operate flip-flop 570 and present a suitable $2_{ff}$ indication on line 594 for application to the control grid 502 of the storage tube. A 1.5 millisecond delay network 596 is provided to delay the indicated control grid turn on signal to insure that the $K_1$ relay in relay group 536 has released to couple the $K_2$ relay contact 586 and the storage tube screen 500 to the $K_1$ relay 598. The $K_2$ relay is operated by a suitable $\overline{0}_{ff}$ indication on relay driver 584 to connect the storage tube screen 500 to the $K_2$ relay contact 586 and thence to a suitable prime-erase voltage.

It may be noted that the initial operation of erase flip-flop 570 to provide a suitable data bit of $2_{ff}$ also provides, after a 0.2 second or 200 millisecond delay provided by delay network 600, an output on line 602 which is applied to trigger the input of flip-flop 570 and thereby provide a suitable $\overline{2}_{ff}$ output of flip-flop 570. Similarly, a 200 millisecond delayed signal on line 602 operates OR gate 604 to trigger flip-flop 568. This is a protective operation to prevent burn out of the storage tube face by a stationary electron beam. Ordinarily the TV sweep relay group 528 during erase and reading operations is operated and the electron beam is being deflected accordingly. However, during writing and selective erasing, the beam is being deflected by signals on lines 516, 518, and 524, 526 respectively. To insure that these last mentioned operations are performed with at least some beam deflection in the event erroneous data is presented to the logic circuit of FIGURE 14, the relay group 524 is suitably operated. Output lines 610 and 612 from the write driver 576 and the selective erase driver 608 respectively operate AND gate 614 which after a two millisecond delay provided by delay and driver network 616 pulls in the TV sweep relay group 528 to couple the corresponding X and Y TV sweep signals on input lines 520 and 522 to the X and Y yoke drivers 506 and 508 of the deflection coil in the storage tube 28. During normal operation this last mentioned operation does not, of course, occur.

The 200 millisecond delayed signal from network 600 is also applied on line 602 to a flip-flop 618. The output of flip-flop 618 is delayed 100 milliseconds by delay network 620 whose output is applied through an OR gate 622 and a flip-flop 624 to an input line 626 of a read AND gate 628. A suitable operating signal is provided on another input line 630 to operate the AND gate 628 and to provide a read signal through a coupling circuit 632 to the storage tube control grid 502. Substantially simultaneously with the operation of the read AND gate 628, the $K_2$ relay is released to connect the storage tube screen 500 through $K_2$ relay contact 634 to a suitable voltage level for the reading operation. A reset of flip-flop 618 occurs by transferring the 100 millisecond delayed signal from network 620 into an input of the flip-flop 618 on line 636.

On OR gate 638 is coupled to the storage tube control grid 502 to allow the various control signals from, for instance, delay network 584 during a writing operation, delay network 596 during an erase operation, and control signals from coupling circuit 632 during a reading operation to be coupled into the storage tube grid. The various circuits 584, 596 and 632 besides performing the operations previously described also set the level of the desired voltage input to the control grid 502. This is illustrated in FIGURE 14 by the variable voltage level controls 640 which can be adjusted to set the voltage levels of the control signals coupled into the OR gate 638 as indicated adjacent the input lines thereto.

The remaining control circuit which is also coupled to the storage tube control grid 502 through the OR gate 638 is a selective erase control and level set circuit 642 which couples an erasing voltage level to the control grid 502. This suitable erasing voltage level on control grid 502 combines with the proper deflection of the electron beam in the storage tube 28 as provided by the X and Y selective erase drive voltages on input lines 524 and 526 to erase only a small portion of information previously written on the storage tube. This selective erase operation is very advantageous in allowing a student to erase for instance a character previously written, rather than erasing the entire screen and having to again go through typing the desired characters and the corresponding writing of the characters on the storage tube 28. Thus, the selective erase operation can save a considerable amount of time, and further provides a system with a flexibility which is very desirable during a teaching operation to aid in preventing the student from being frustrated in delaying his presentation of what he feels to be the correct answer to a problem.

In this operation, a Mode 7 selective erase signal is received on input line 542 from the output addressor and logic apparatus 32, and assuming that station 0 is to be acted upon, line 548 also receives a Station Ready Control $R_0$ signal which is directed to an AND gate 644 to trigger a flip-flop 646. Referring also to FIGURE 15, an Output Data Ready indication from the logic apparatus 32 is combined with the Mode 7 signal to operate AND gate 648 to trigger a flip-flop 650 and after a 45 microsecond delay through network 652, an Enable signal is provided on output line 654 which is coupled to input lines 656 on FIGURE 14. An undelayed output of flip-flop 646 is coupled to AND gate 658 which is combined with the Enable signal from input line 656 to remove an operating condition on input line 660 of AND gate 662. An output line 664 is coupled to the respective station 0 AND gate 266 in the input scanner and the logic apparatus 30 illustrated in FIGURE 9 to present an indication that no input data to the computer from station 0 is to be received since the storage tube is busy with a selective erase operation.

The output of flip-flop 646 combines with the Enable signal and suitable data signal on input line 666 of AND gate 668 to present a selective erase control signal through the selective erase set level circuit 642 to the storage tube control grid 502. A second output of the flip-flop 646 is coupled through a 0.5 millisecond delay network 670 to an AND gate 672 which resets flip-flop 646 and thereby removes operating signals to AND gates 658 and 668.

During the portion of time when the storage tube control grid 502 is receiving a suitable voltage level thereon for performing erasing operations on the storage tube screen, the storage tube deflection coils are subjected to the proper sweep voltages derived from a selective erase portion of the X and Y base address digital to analog converter 26. This selective erase portion of the converter 26 is illustrated in FIGURE 15 and effectively provides a small raster completely surrounding the character which is to be erased. In FIGURE 15, the sweeping voltages are provided by an X TV sweep voltage from the sweep sync generator 36 which is coupled into input line 674 and through a switch 676 to an X base address ladder 678. This provides the horizontal storage tube sweep voltage during the selective erase operation. Also, the output of the delay network 652 triggers a slow sweep circuit 680 which is coupled through a corresponding switch 682 into a Y base address ladder 684 to provide the vertical sweep of the storage tube deflection coil during a selective erase operation.

The selective erase portion of converter 26 illustrated in FIGURE 15 designates a particular portion of the sweep which is to be utilized during the time when the storage tube control grid 502 receives the selective erase signal. A small raster portion of the full raster provided by a full sweep of the horizontal and vertical deflection coils in storage tube 28 is designated by a base address identifying one corner of the small raster. This base address is provided by Mode 7 data specifying the base position of the small raster by a 16 bit data word. Eight bits presented on data input lines 686 through 688 specify the Y base position and are placed into a Y base address register 690 through a series of AND gates 692 as the data is received from the central computer via the output address and logic apparatus 32. The digital information output from the registers 690 is coupled through corresponding switches 694 and into the Y base address ladder 684 to select a portion of the vertical sweep voltage from slow sweep circuit 680 to be presented to the storage tube deflection coil through the selective erase sweep input line 526 at the storage tube control circuit of station 0.

Another group of eight data bits is coupled into data input lines 696 through 698 and into a corresponding X base address register 700 consisting of a group of flip-flops to specify the X base position. The output of the X base address ladder 678 is coupled to a deflection coil of the storage tube 28 through selective erase sweep line 524 at the storage tube in station 0. The X and Y base address ladders 678 and 684 are identical in construction to the X and Y base address ladders 470 and 472 in FIGURE 13. Thus, the selective erase base address digital to analog converter portion illustrated in FIGURE 15 designates through the data lines 686, 688 and 696, 698 and X and Y base position or corner of a small raster portion of the entire raster provided by the full sweep voltages from input line 674 and the slow sweep circuit 680.

Referring now to FIGURE 14, for the selective erase operation the AND gate 606 is operated to pull in the selective erase relay group 534 and thus close the corresponding contacts in the X and Y function circuits 510 and 512. This operation consequently couples the selective erase small raster sweep voltage from the X and Y base address ladders in FIGURE 15 to the yoke drivers 506 and 508 to deflect the storage tube electron beam in order to define the small raster at the position of the character to be erased. A simultaneous presentation of an erase voltage level on control grid 502 permits the desired character to be erased from the storage tube 28. The storage tube 28 is then placed into a reading operation wherein the information on the storage tube screen minus the erased character is presented on signal electrode 504 and through video output line 532 is transferred to the station 0 video monitor 20.

From the foregoing detailed description it can be realized that the peripheral equipment controlled by the central control unit is extremely versatile and enables a variety of teaching material in different instructional formats to be displayed. For instance, the student may be presented information on slides from the slide scanner unit, view a movie film under direction of for instance mode M3, view information on closed circuit television or from other video sources such as commercial television displayed directly on the station video monitor, or receive audio stimuli. Further the entire system provides flexibility in the type of teaching logic desired for instructing the control unit in the manner in which this teaching material is to be presented to the students. Changing teaching logic for the system merely requires that a different program be written for the control computer in the control unit corresponding to the overall operations required for the desired teaching logic. Two examples of such teaching logics have been illustrated, and this by no means exhausts the possibilities, as others may utilize the teachings herein to devise alternative teaching logics and corresponding programs for the programmed control unit.

The foregoing detailed description has been given for clearness of understanding only, and no unnecessary limitations should be understood therefrom, as modifications will be obvious to those skilled in the art.

What is claimed is:

1. A system for individually coupling selected display material to corresponding display stations, said system comprising:
    a plurality of display material each bearing different information;
    a plurality of display stations having respective station addresses, each station including display means for selectively receiving and displaying said material, and means for requesting selected display material from said plurality thereof;
    means for sequentially addressing each of said display stations to determine respective stations requesting selected display material;
    means for sequentially selecting display material from said plurality in response to said requests initiated in respective display stations; and
    means for selecting a display station address to individually couple said selected display material to the respective display station.

2. A display system for displaying a plurality of video information, said display system comprising:
    a plurality of display stations, each including video display means for individually displaying said video information;
    input data means associated with each of said display stations for requesting one of a plurality of said video information to be selected and displayed on said respective video display means;
    response means associated with each of said display stations for entering a response to said selected and displayed video information; and
    a single central computer control means being accessed by said input data means of each of said display stations for selecting appropriate video information from said plurality thereof responsive to the nature of the response for each of said respective display stations in accordance with the particular request from said respective input data means;
    said computer control means including means for transmitting said selected appropriate video information respectively to said video display means at corresponding display stations.

3. A display system as claimed in claim 1, wherein said input data means associated with each of said display systems includes means for sequentially requesting said one of a plurality of said video information to be selected and displayed on said respective video display means.

4. A display system as claimed in claim 1, wherein at least two of said plurality of display stations each includes means for requesting said one of a plurality of video information to be selected and displayed at each of said two stations, and said computer control means includes means for selecting and transmitting said requested video information for display at each of said two stations.

5. A display system as claimed in claim 4, including computer generated character means for generating a plurality of character symbols, means associated with each of said two stations for requesting said character symbols to be selected and displayed at each of said two stations, and wherein said computer control means includes means for selecting and transmitting said requested character information for display at each of said two stations.

6. A computer controlled display system for displaying a plurality of display information in various formats, said display system comprising:
    a plurality of display stations, each including display means for individually displaying said display information;
    request means associated with each of said display stations for requesting one of a plurality of said display information to be selected and displayed on said respective display means;
    response means associated with each of said display stations for entering a response to said selected and displayed display information; and
    a single central computer control means being accessed by said request means of each of said display stations for selecting appropriate display information from said plurality thereof responsive to the nature of the response for each of said respective display stations in accordance with the particular request from said respective request means;

said computer control means including means for transmitting said selected appropriate display information respectively to said display means at corresponding display stations.

7. A computer controlled display teaching system for displaying a plurality of teaching material in various information formats, said teaching system comprising:
  a plurality of student stations, each including display means for individually displaying said teaching material;
  request means associated with each of said student stations for requesting one of a plurality of said teaching material to be selected and displayed on said respective display means;
  response means associated with each of said student stations for entering a response to said selected and displayed teaching material; and
  a single central computer control means being accessed by said request means of each of said student stations for selecting appropriate teaching material from said plurality thereof responsive to the nature of the response for each of said respective student stations in accordance with the particular request from said respective request means;
  said computer control means including means for transmitting said selected appropriate teaching material respectively to said display means at corresponding student stations.

8. A computer controlled display teaching system as claimed in claim 7, including conversion means for converting said teaching material in various information formats into corresponding electrical video signals, and wherein said display means comprises video display means for displaying said selected appropriate teaching material transmitted to the corresponding student station by said single central computer control means.

9. A display teaching system comprising:
  a first plurality of teaching material corresponding to a first teaching logic;
  a second plurality of teaching material corresponding to a second teaching logic;
  a plurality of student stations each including display means for displaying said teaching material;
  selection means associated with each of said student stations for selecting respective teaching material from either of said first or second pluralities thereof;
  computer control means for directing said respective selected teaching material to corresponding student stations in response to said selection means, said computer control means operating in accordance with predetermined instructions corresponding to one of said teaching logics; and
  means for varying said computer control means instructions to operate said computer control means in accordance with the other of said teaching logics.

10. A display system for displaying a plurality of photographic information-bearing slides, said display system comprising:
  conversion means for converting said information on said slides into a corresponding plurality of electrical video signals;
  a plurality of display stations, each including video display means for receiving said electrical video signals and individually displaying said slides;
  input data means associated with each of said display stations for requesting one of a plurality of said slides to be selected and displayed on said respective video display means;
  response means associated with each of said display stations for entering a response to said information on said selected and displayed slides; and
  a single central computer control means being accessed by said input data means of each of said display stations for selecting an appropriate slide from said plurality thereof responsive to the nature of the response for each of said respective display stations in accordance with the particular request from said respective input data means:
  said computer control means including means for transmitting the electrical video signal corresponding to said selected appropriate slide respectively to said video display means at corresponding display stations.

11. A display teaching system for sequentially displaying selected slides from a plurality thereof comprising:
  conversion means for converting information on said slides into a corresponding plurality of video signals;
  character generating means to generate a plurality of character symbols;
  video display means for displaying said selected slide and said character symbols;
  first input data means for requesting a particular one of said slides to be displayed on said video display means;
  first control means coupled to said input data means for controlling the selection of said particular slide from said plurality thereof as indicated by said input data means;
  second input data means for requesting a particular one of said character symbols;
  output data means for designating the particular slide selected by said first control means in accordance with said first input data means;
  switching means coupled to said output data means and intermediate said plurality of video signals and said video display means to couple the video signal corresponding to said particular slide to said video display means; and
  second control means coupled to said second input data means to control the selection and writing of said requested character symbol on said display means superimposed on said particular slide.

12. A display teaching system for displaying to a student photographic information-bearing slides including statements of questions to be answered by said student, said system comprising:
  at least one display station, including input data means for requesting a particular slide and video display means for individually displaying said slides;
  phototube means responsive to the information on said slides for converting said information into electrical video signals for presentation on said display means;
  computer control means for selecting and transmitting said requested slide from said plurality thereof to said display means;
  character generating means initiated by said student to generate said student answer in the form of character symbols on said display means;
  means for superimposing said student answer on said video display means simultaneously with the display of said slides with statements of question;
  means for judging said related questions and answers; and
  means superimposing the results of said judging in character form on said video display means simultaneous with the display of said questions and student answers on said video display means.

13. A display teaching system as claimed in claim 12, including a plurality of said display stations, and wherein said computer control means includes means for selecting and transmitting said requested slides to said respective display stations, said system including means for superimposing the respective results of said judging for each of said respective questions and student answers at each respective display station.

14. A display teaching system for displaying to a student a plurality of video display material including questions to be answered by said student, said display system comprising:
- at least one display station, including, video display means for individually displaying said display material;
- an electron beam storage tube for intermediate display of said answers initiated by said student for writing said answers on said storage tube;
- said storage tube having means including a grid for controlling said electron beam between a write level for writing answers on said tube and an erase level for erasing answers on said tube, and deflection means for positioning said electron beam; and
- said display station further including means for simultaneously displaying said display material with questions and said respective student answers from said storage tube on said video display means;
- said display system including computer generated point by point video information for generating said answers in the form of point by point video information to be presented to said storage tube;
- means initiated by said student and coupled to said grid and said deflection means for respectively adjusting the voltage level of said grid to said write level and the position of said electron beam to write said answers on said storage tube in response to said computer generated point by point video information; and
- means initiated by said student and coupled to said grid and said deflection means for respectively adjusting the voltage level of said grid to said erase level and the position of said electron beam to selectively erase desired portions of said student answer on said storage tube.

15. A display teaching system as claimed in claim 14, wherein said computer generated point by point video information comprises alpha-numeric characters for writing said answers on said storage tube in the form of alphanumeric character symbols.

16. A display teaching system as claimed in claim 14, including a plurality of said display stations each including means for requesting a particular one from said plurality of display material for display on said respective video display means, said system further including a single central computer control means coupled to each of said display stations for selecting and transmitting said requested display material respectively to said video display means at corresponding display stations, said computer control means including means for controlling the selective transmission of said respective student answers to said video display means at corresponding display stations for simultaneously displaying said requested display material with questions and said respective student answers at said respective display stations.

References Cited
UNITED STATES PATENTS

| | | | |
|---|---|---|---|
| 3,037,192 | 5/1962 | Everett | 340—172.5 |
| 3,063,036 | 11/1962 | Reach et al. | 340—172.5 |
| 3,075,178 | 1/1963 | James | 340—172.5 |
| 3,103,073 | 10/1963 | Wickl et al. | 35—9 |
| 3,121,959 | 2/1964 | Uttal | 35—9 |
| 3,141,243 | 7/1964 | Chapman et al. | 35—9 |
| 3,195,403 | 7/1965 | Ascanie et al. | 35—9 |
| 3,248,705 | 4/1966 | Dammann et al. | 340—172.5 |
| 3,256,516 | 5/1966 | Melig et al. | 340—172.5 |
| 3,273,260 | 9/1966 | Walker | 35—9 |
| 3,278,677 | 11/1966 | Fannay | 178—6 |

EUGENE R. CAPOZIO, *Primary Examiner.*

W. W. NIELSEN, *Assistant Examiner.*

UNITED STATES PATENT OFFICE
CERTIFICATE OF CORRECTION

Patent No. 3,405,457                                            October 15, 1968

Donald L. Bitzer

It is certified that error appears in the above identified patent and that said Letters Patent are hereby corrected as shown below:

Column 1, line 21, cancel the heavy line and insert same, after line 26, same column 1. Column 2, line 4, "learing" should read -- learning --. Column 3, line 51, "respond" should read -- responded --. Column 4, line 24, "wtih" should read -- with --; line 49, "particulr" should read -- particular --. Column 6, line 42, "types" should read -- type --. Column 7, line 38, "weyset" should read -- keyset --. Column 8, line 55, "distinquished" should read -- distinguished --. Column 9, line 67, "Mode" should read -- Mode 1 --. Column 10, line 40, "wiith" should read -- with --. Column 11, line 69, "plannar" should read -- planner --. Column 12, line 5, "mispelled" should read -- misspelled --. Column 15, lines 18 and 19, "realised" should read -- realized --. Column 22, lines 54 and 55, "flip-flop 142" should read -- flip-flop 412 --. Column 27, line 16, "driver 584" should read -- driver 585 --; line 62, "On" should read -- An --. Column 30, line 18, "respective display station" should read -- respective requesting display station --; lines 42 and 47, claim reference numeral "1", each occurrence, should read -- 2 --; line 44, "systems" should read -- stations --.

Signed and sealed this 3rd day of March 1970.

(SEAL)
Attest:

EDWARD M. FLETCHER, JR.                              WILLIAM E. SCHUYLER, JR.
Attesting Officer                                                Commissioner of Patents